(12) United States Patent
Vassallo et al.

(10) Patent No.: US 7,978,186 B2
(45) Date of Patent: Jul. 12, 2011

(54) MECHANISMS FOR CONTROL KNOBS AND OTHER INTERFACE DEVICES

(75) Inventors: Steven P. Vassallo, Palo Alto, CA (US); Kenneth M. Martin, Palo Alto, CA (US)

(73) Assignee: Immersion Corporation, San Jose, CA (US)

( * ) Notice: Subject to any disclaimer, the term of this patent is extended or adjusted under 35 U.S.C. 154(b) by 987 days.

(21) Appl. No.: 11/232,576

(22) Filed: Sep. 22, 2005

(65) Prior Publication Data

US 2006/0012584 A1      Jan. 19, 2006

Related U.S. Application Data

(60) Division of application No. 09/637,513, filed on Aug. 11, 2000, now Pat. No. 7,038,667, which is a continuation-in-part of application No. 09/179,382, filed on Oct. 26, 1998, now Pat. No. 6,154,201.

(60) Provisional application No. 60/149,781, filed on Aug. 18, 1999, provisional application No. 60/159,930, filed on Oct. 14, 1999, provisional application No. 60/182,557, filed on Feb. 15, 2000.

(51) Int. Cl.
*G06F 3/033* (2006.01)
(52) U.S. Cl. .......................... 345/184; 345/163
(58) Field of Classification Search .......... 345/156–158, 345/161, 163, 167, 184; 361/679.1, 679.18; 463/38; 700/85
See application file for complete search history.

(56) References Cited

U.S. PATENT DOCUMENTS

| 3,157,853 | A | 11/1964 | Hirsch |
| 3,220,121 | A | 11/1965 | Cutler |
| 3,497,668 | A | 2/1970 | Hirsch |
| 3,517,446 | A | 6/1970 | Corlyon et al. |

(Continued)

FOREIGN PATENT DOCUMENTS

EP          0349086          1/1990

(Continued)

OTHER PUBLICATIONS

United States Patent and Trademark Office, Office Action, U.S. Appl. No. 09/637,513, mailed Mar. 26, 2003.

(Continued)

*Primary Examiner* — Kevin M Nguyen
*Assistant Examiner* — Kenneth B Lee, Jr.
(74) *Attorney, Agent, or Firm* — Kilpatrick Townsend & Stockton LLP

(57) ABSTRACT

Mechanisms for a control knob or other interface device providing additional degrees of freedom for the knob. One embodiment provides a rotatable knob moveable also in lateral plane approximately perpendicular to the axis of rotation. A mechanism providing the lateral motion can include agate member and a plunger member that engages grooves in the gate member. A rotational sensor detects a rotational position and a lateral sensor can detect a lateral position of the knob. Another embodiment provides an actuator that includes a shaft that is coaxial with the axis of rotation and which can be moved linearly along the axis of rotation with respect to actuator housing to accommodate linear motion of the knob. In another embodiment, a gear assembly including two interlocked gears is provided to transmit rotational motion from the knob to the sensor, and the interlocked gears translate with respect to each other when the knob is translate along the rotational axis.

10 Claims, 11 Drawing Sheets

U.S. PATENT DOCUMENTS

| | | | |
|---|---|---|---|
| 3,902,687 A | 9/1975 | Hightower | |
| 3,903,614 A | 9/1975 | Diamond et al. | |
| 3,919,691 A | 11/1975 | Noll | |
| 4,050,265 A | 9/1977 | Drennen et al. | |
| 4,131,033 A | 12/1978 | Wright et al. | |
| 4,160,508 A | 7/1979 | Salsbury | |
| 4,236,325 A | 12/1980 | Hall et al. | |
| 4,477,043 A | 10/1984 | Repperger | |
| 4,513,235 A | 4/1985 | Acklam et al. | |
| 4,560,983 A | 12/1985 | Williams | |
| 4,581,491 A | 4/1986 | Boothroyd | |
| 4,599,070 A | 7/1986 | Hladky et al. | |
| 4,686,397 A * | 8/1987 | Becker | 310/36 |
| 4,706,294 A | 11/1987 | Ouchida | |
| 4,708,656 A | 11/1987 | De Vries et al. | |
| 4,712,101 A | 12/1987 | Culver | |
| 4,713,007 A | 12/1987 | Alban | |
| 4,782,327 A | 11/1988 | Kley et al. | |
| 4,795,296 A | 1/1989 | Jau | |
| 4,795,929 A * | 1/1989 | Elgass et al. | 310/36 |
| 4,800,721 A | 1/1989 | Cemenska et al. | |
| 4,823,634 A | 4/1989 | Culver | |
| 4,868,549 A | 9/1989 | Affinito et al. | |
| 4,891,764 A | 1/1990 | McIntosh | |
| 4,930,770 A | 6/1990 | Baker | |
| 4,934,694 A | 6/1990 | McIntosh | |
| 4,935,728 A | 6/1990 | Kley | |
| 4,943,866 A | 7/1990 | Barker et al. | |
| 4,964,004 A | 10/1990 | Barker | |
| 4,979,050 A | 12/1990 | Westland et al. | |
| 4,983,901 A | 1/1991 | Lehmer | |
| 5,007,300 A | 4/1991 | Siva | |
| 5,019,761 A | 5/1991 | Kraft | |
| 5,022,407 A | 6/1991 | Horch et al. | |
| 5,035,242 A | 7/1991 | Franklin | |
| 5,038,089 A | 8/1991 | Szakaly | |
| 5,044,956 A | 9/1991 | Behensky et al. | |
| 5,078,152 A | 1/1992 | Bond | |
| 5,095,303 A | 3/1992 | Clark et al. | |
| 5,107,080 A | 4/1992 | Rosen | |
| 5,138,154 A | 8/1992 | Hotelling | |
| 5,139,261 A | 8/1992 | Openiano | |
| 5,146,566 A | 9/1992 | Hollis, Jr. et al. | |
| 5,185,561 A | 2/1993 | Good et al. | |
| 5,186,629 A | 2/1993 | Rohen | |
| 5,186,695 A | 2/1993 | Mangseth et al. | |
| 5,189,355 A | 2/1993 | Larkins et al. | |
| 5,193,963 A | 3/1993 | McAffee et al. | |
| 5,204,600 A | 4/1993 | Kahkoska | |
| 5,212,473 A | 5/1993 | Louis | |
| 5,220,260 A | 6/1993 | Schuler | |
| 5,223,776 A | 6/1993 | Radke et al. | |
| 5,235,868 A | 8/1993 | Culver | |
| 5,240,417 A | 8/1993 | Smithson et al. | |
| 5,254,919 A | 10/1993 | Bridges et al. | |
| 5,271,290 A | 12/1993 | Fischer | |
| 5,275,174 A | 1/1994 | Cook | |
| 5,280,276 A | 1/1994 | Kwok | |
| 5,296,846 A | 3/1994 | Ledley | |
| 5,296,871 A | 3/1994 | Paley | |
| 5,299,810 A | 4/1994 | Pierce | |
| 5,309,140 A | 5/1994 | Everett | |
| 5,313,230 A | 5/1994 | Venolia et al. | |
| 5,317,336 A | 5/1994 | Hall | |
| 5,334,027 A | 8/1994 | Wherlock | |
| 5,355,148 A | 10/1994 | Anderson | |
| 5,374,942 A | 12/1994 | Gilligan et al. | |
| 5,381,080 A | 1/1995 | Schnell et al. | |
| 5,382,885 A | 1/1995 | Salcudean et al. | |
| 5,389,865 A | 2/1995 | Jacobus et al. | |
| 5,396,266 A | 3/1995 | Brimhall | |
| 5,398,044 A | 3/1995 | Hill | |
| 5,405,152 A | 4/1995 | Katanics et al. | |
| 5,414,337 A | 5/1995 | Schuler | |
| 5,457,479 A | 10/1995 | Cheng | |
| 5,466,213 A | 11/1995 | Hogan | |
| 5,473,344 A | 12/1995 | Bacon et al. | |
| 5,477,237 A | 12/1995 | Parks | |
| 5,491,477 A | 2/1996 | Clark et al. | |
| 5,513,100 A | 4/1996 | Parker et al. | |
| 5,530,455 A | 6/1996 | Gillick et al. | |
| 5,541,379 A | 7/1996 | Kim | |
| 5,542,672 A | 8/1996 | Meredith | |
| 5,543,821 A | 8/1996 | Marchis et al. | |
| 5,547,382 A | 8/1996 | Yamasaki | |
| 5,576,727 A | 11/1996 | Rosenberg et al. | |
| 5,589,828 A * | 12/1996 | Armstrong | 341/20 |
| 5,589,854 A | 12/1996 | Tsai | |
| 5,591,082 A | 1/1997 | Jensen et al. | |
| 5,623,582 A | 4/1997 | Rosenberg | |
| 5,625,576 A | 4/1997 | Massie et al. | |
| 5,627,531 A | 5/1997 | Posso et al. | |
| 5,642,469 A | 6/1997 | Hannaford et al. | |
| 5,643,087 A | 7/1997 | Marcus et al. | |
| 5,656,901 A | 8/1997 | Kurita | |
| 5,666,138 A | 9/1997 | Culver | |
| 5,666,473 A | 9/1997 | Wallace | |
| 5,691,747 A | 11/1997 | Amano | |
| 5,691,898 A | 11/1997 | Rosenberg et al. | |
| 5,709,219 A | 1/1998 | Chen et al. | |
| 5,712,725 A | 1/1998 | Faltermeier et al. | |
| 5,714,978 A | 2/1998 | Yamanaka et al. | |
| 5,721,566 A | 2/1998 | Rosenberg et al. | |
| 5,724,068 A | 3/1998 | Sanchez et al. | |
| 5,724,106 A | 3/1998 | Autry et al. | |
| 5,734,373 A | 3/1998 | Rosenberg et al. | |
| 5,736,978 A | 4/1998 | Hasser et al. | |
| 5,742,278 A | 4/1998 | Chen et al. | |
| 5,745,057 A | 4/1998 | Sasaki et al. | |
| 5,749,577 A | 5/1998 | Couch et al. | |
| 5,754,023 A | 5/1998 | Rosten et al. | |
| 5,755,577 A | 5/1998 | Gillio | |
| 5,760,764 A | 6/1998 | Martinelli | |
| 5,766,016 A | 6/1998 | Sinclair | |
| 5,767,839 A | 6/1998 | Rosenberg | |
| 5,781,172 A | 7/1998 | Engel et al. | |
| 5,785,630 A | 7/1998 | Bobick et al. | |
| 5,787,152 A | 7/1998 | Freadman | |
| 5,790,108 A | 8/1998 | Salcudean et al. | |
| 5,805,140 A | 9/1998 | Rosenberg et al. | |
| 5,808,568 A | 9/1998 | Wu | |
| 5,808,603 A | 9/1998 | Chen | |
| 5,823,876 A | 10/1998 | Unbchand | |
| 5,825,308 A | 10/1998 | Rosenberg | |
| 5,831,408 A | 11/1998 | Jacobus et al. | |
| 5,841,428 A | 11/1998 | Jaeger et al. | |
| 5,889,506 A | 3/1999 | Lopresti et al. | |
| 5,889,670 A | 3/1999 | Schuler et al. | |
| 5,889,672 A | 3/1999 | Schuler et al. | |
| 5,912,661 A | 6/1999 | Siddiqui | |
| 5,924,484 A | 7/1999 | Andersson et al. | |
| 5,944,151 A | 8/1999 | Jakobs et al. | |
| 5,959,382 A * | 9/1999 | Dauwalter | 310/90.5 |
| 5,959,613 A | 9/1999 | Rosenberg | |
| 5,990,869 A | 11/1999 | Kubica et al. | |
| 6,111,577 A | 8/2000 | Zilles et al. | |
| 6,128,006 A * | 10/2000 | Rosenberg et al. | 345/163 |
| 6,147,674 A | 11/2000 | Rosenberg et al. | |
| 6,219,032 B1 | 4/2001 | Rosenberg et al. | |
| 6,219,034 B1 | 4/2001 | Elbing et al. | |
| 6,292,170 B1 | 9/2001 | Chang et al. | |
| 6,353,850 B1 | 3/2002 | Wies et al. | |
| 6,422,941 B1 | 7/2002 | Thorner et al. | |
| 6,859,819 B1 | 2/2005 | Rosenberg et al. | |
| 6,985,133 B1 * | 1/2006 | Rodomista et al. | 345/156 |

FOREIGN PATENT DOCUMENTS

| | | |
|---|---|---|
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

United States Patent and Trademark Office, Office Action, U.S. Appl. No. 09/637,513, mailed May 22, 2003.

United States Patent and Trademark Office, Office Action, U.S. Appl. No. 09/637,513, mailed Jan. 12, 2004.

United States Patent and Trademark Office, Office Action, U.S. Appl. No. 09/637,513, mailed Jun. 21, 2004.

United States Patent and Trademark Office, Office Action, U.S. Appl. No. 09/637,513, mailed Jan. 26, 2005.

Adachi, Y. et al., "Sensory Evaluation of Virtual Haptic Push-Buttons," Technical Research Center, Suzuki Motor Corp., 1994, pp. 1-7.

Adelstein et al., "A High Performance Two Degree-of-Freedom Kinesthetic Interface," Massachusetts Institute of Technology, 1992, pp. 108-112.

Adelstein et al., "Design and Implementation of a Force Reflecting Manipulandum for Manual Control Research," NASA Ames Research Center, 1992, pp. 1-12.

Adelstein, "A Virtual Environment System for the Study of Human Arm Tremor," Ph.D. Dissertation, Dept. Of Mechanical Engineering, MIT, Jun. 1989, pp. 1-252.

Akamatsu et al., "Multimodal Mouse: A Mouse-Type Device with Tactile & Force Display," 1994, Presence, vol. 3, p. 73-80.

Atkinson et al., "Computing with Feeling," vol. 2, 1977, pp. 97-103.

Aukstakalnis et al., "Silicon Mirage: The Art and Science of Virtual Reality," ISBN 0-938151-82-7, 1992, pp. 129-180.

Baigrie, "Electric Control Loading—A Low Cost, High Performance Alternative," Proceedings, Nov. 6-8, 1990, pp. 247-254.

Batter et al., "Grope 1: A Computer Display to the Sense of Feel," 1971, IFIP Congress, p. 759-763.

Bejczy et al., "A Laboratory Breadboard System for Dual-Arm Teleoperation," SOAR '89 Workshop, JSC, Houston, TX, Jul. 25-27, 1989, pp. 1-12.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings of Fourth CISM-IFToMM, Sep. 8-12, 1981.

Bejczy, "Sensors, Controls, and Man-Machine Interface for Advanced Teleoperation," Science, vol. 208, No. 4450, 1980, pp. 1327-1335.

Bejczy, et al., "Universal Computer Control System (UCCS) for Space Telerobots," CH2413-3/87/0000/0318501.00 1987 IEEE, 1987, pp. 318-324.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Brooks Jr., et al., "Project GROPE-Haptic Displays for Scientific Visualization," Computer Graphics, vol. 24, 1990, pp. 177-185.

Burdea et al., "Distributed Virtual Force Feedback, Lecture Notes for Workshop on Force Display in Virtual Environments and its Application to Robotic Teleoperation," 1993 IEEE International Conference on Robotics and Automation, May 2, 1993, pp. 25-44.

Buttolo et al., "Pen-Based Force Display for Precision Manipulation in Virtual Environments," 1995, IEEE, pp. 217-224.

Caldwell et al., "Enhanced Tactile Feedback (Tele-Taction) Using a Multi-Functional Sensory System," 1050-4729/93, 1993, pp. 955-960.

Colgate et al., "Implementation of Stiff Virtual Walls in Force-Reflecting Interfaces," Dept. of Mech. Engineering, Northwestern University, 1993, pp. 1-7.

"Cyberman Technical Specification," Logitech Cyberman SWIFT Supplement, Apr. 5, 1994.

Eberhardt et al., "Including Dynamic Haptic Perception by the Hand: System Description and Some Results," DSC-vol. 55-1, Dynamic Systems and Control: vol. 1, ASME 1994, pp. 345-351.

Eberhardt et al., "OMAR—A Haptic display for speech perception by deaf and deaf-blind individuals," IEEE Virtual Reality Annual International Symposium, Seattle, WA, Sep. 18-22, 1993, pp. 195-201.

Ellis et al., "Design & Evaluation of a High-Performance Prototype Planar Haptic Interface," ASME, vol. 49, 1993, pp. 55-64.

Fischer et al., "Specification and Design of Input Devices for Teleoperation," IEEE CH2876-1, 1990, pp. 540-545.

Gobel et al., "Tactile Feedback Applied to Computer Mice," International Journal of Human-Computer Interaction, vol. 7, No. 1, 1995, pp. 1-24.

Gotow et al., "Controlled Impedance Test Apparatus for Studying Human Interpretation of Kinesthetic Feedback," WA11-11:00, pp. 332-337.

Gotow, J.K. et al., "Perception of Mechanical Properties at the Man-Machine Interface," IEEE CH2503-1/87/0000-0688, 1987, pp. 688-689.

Hannaford et al., "Force Feedback Cursor Control," NASA Tech Brief, vol. 13, 1989, pp. 1-4.

Hayward et al., "Design & Multi-Objective Optimization of a Linkage for a Haptic Interface," Advances in Robot Kinematics, 1994, pp. 359-368.

Hirota et al., "Development of Surface Display," IEEE 0-7803-1363-1, 1993, pp. 256-262.

Howe et al., "Task Performance with a Dextrous Teleoperated Hand System," SPIE, vol. 1833, 1992, pp. 1-9.

Howe, "A Force-Reflecting Teleoperated Hand System for the Study of Tactile Sensing in Precision Manipulation," Proceedings of the 1992 IEEE International Conference on Robotics and Automation, Nice, France, May 1992, pp. 1321-1326.

IBM Technical Disclosure Bulletin, "Mouse Ball-Actuating Device With Force and Tactile Feedback," vol. 32, No. 9B, Feb. 1990, pp. 230-235.

Iwata, "Pen-based Haptic Virtual Environment," 0-7803-1363-1/93 IEEE, Institute of Engineering Mechanics, University of Tsukuba, Japan, pp. 287-292.

Jacobsen et al., "High Performance, Dextrous Telerobotic Manipulator With Force Reflection," Intervention/ROV '91 Conference & Exposition, Hollywood, Florida, May 21-23, 1991, pp. 213-218.

Jones et al., "A perceptual analysis of stiffness," ISSN 0014-4819 Springer International (Springer-Verlag); Experimental Brain Research, vol. 79, No. 1, 1990, pp. 150-156.

Kaczmarek et al., "Tactile Displays," Virtual Environment Technologies. pp. 349-414.

Kelley et al., "MagicMouse: Tactile and Kinesthetic Feedback in the Human-Computer Interface using an Electromagnetically Actuated Input/Out Device," 1993, University of Brit. Col., pp. 1-27.

Kontarinis et al., "Display of High-Frequency Tactile Information to Teleoperators," Telemanipulator Technology and Space Telerobotics, Won S. Kim, Editor, Proc. SPIE vol. 2057, Sep. 7-9, 1993, pp. 40-50.

Marcus, "Touch Feedback in Surgery," Proceedings of Virtual Reality and Medicine The Cutting Edge, Sep. 8-11, 1994, pp. 96-97.

McAffee, "Teleoperator Subsystem/Telerobot Demonstrator: Force Reflecting Hand Controller Equipment Manual," JPL D-5172, A1-A36, B1-B5, C1-C36, Jan. 1988, pp. 1-50.

Millman et al., "Design of a Four Degree-of-Freedom Force-Reflecting Manipulandum with a Specified Force/Torque Workspace," IEEE CH2969-4, 1991, pp. 1488-1493.

Minsky et al., "Feeling & Seeing: Issues in Force Display," ACM 089791-351-5, 1990, pp. 235-242, 270.

Minsky, "Computational Haptics: The Sandpaper System for Synthesizing Texture for a Force-Feedback Display," Ph.D. Dissertation, MIT, Jun. 1995, pp. 1-217.

Munch et al., "Intelligent Control for Haptic Displays," 1996, Eurographics, vol. 15, No. 3, pp. C-217-C-226.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995, pp. 309-319.

Ouh-Young, "Force Display in Molecular Docking," Order No. 9034744, 1990 pp. 1-369.

Ouh-Young, "A Low-Cost Force Feedback Joystick and Its Use in PC Video Games," IEEE Transactions on Consumer Electronics, vol. 41, No. 3, Aug. 1995. pp. 787-794.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387,1990, pp. 1-109; abstract pp. 215-222.

Payatte et al., "Evaluation of a Force Feedback (Haptic) Computer Pointing Device in Zero Gravity," ASME Dynamic Systems, vol. 58, Oct. 17, 1996, pp. 547-553.

Pimentel et al., "Virtual Reality: through the new looking glass," 2nd Edition; McGraw-Hill, ISBN 0-07-050167-X, 1994, pp. 41-202.

Rabinowitz et al., "Multidimensional tactile displays: Identification of vibratory intensity, frequency, and contactor area," Journal of The Acoustical Society of America, vol. 82, No. 4, Oct. 1987, pp. 1243-1252.

Ramstein et al., "The Pantograph: A Large Workspace Haptic Device for a Multimodal Human-Computer Interaction," Computer-Human Interaction CHI '94, 1994, pp. 1-3.

Ramstein, Combining Haptic & Braille Technologies: Design Issues & Pilot Study, ACM Conf. On Asst. Tech., Apr. 11, 1996, pp. 37-44.

Rosenberg et al., "Commercially Viable Force Feedback Controller for Individuals with Neuromotor Disabilities," Wright Patterson AFB, 1996, pp. 1-33.

Rosenberg, L., "The Use of Virtual Fixtures to Enhance Operator Performance in Time Delayed Teleoperation," Wright-Patterson AFB, 1993, pp. 1-45.

Rosenberg, Louis B., "Perceptual Design of a Virtual Rigid Surface Contact," Center for Design Research Stanford University, Air Force Material Command, Apr. 1993, pp. 1-40.

Russo, "Controlling Dissipative Magnetic Particle Brakes in Force Reflective Devices," DSC-vol. 42, Advances in Robotics, ASME 1992, pp. 63-70.

Russo, "The Design and Implementation of a Three Degree of Freedom Force Output Joystick," MIT Libraries Archives Aug. 14, 1990, pp. 1-131.

Russo, "The Design and Implementation of a Three Degree-of-Freedom Force Output Joystick," Dept. of Mech. Engineering, 1990, May 1990, pp. 8-98.

Scannell, "Taking a Joystick Ride," Computer Currents, Boston Edition, vol. 9, No. 11, Nov. 1994.

Schmult et al., "Application Areas for a Force-Feedback Joystick," 1993, Advances in Robotics, Mechatronics, and Haptic Interfaces, vol. 49, pp. 47-54.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992, pp. 159-178.

Snow et al., "Model-X Force-Reflecting-Hand-Controller," NT Control No. MPO-17851; JPL Case No. 5348, Jun. 15, 1989, pp. 1-4.

Stanley et al., "Computer Simulation of Interacting Dynamic Mechanical Systems Using Distributed Memory Parallel Processors," DSC-vol. 42, Advances in Robotics, ASME 1992, pp. 55-61.

Su, S. Augustine et al., "The Virtual Panel Architecture: A 3D Gesture Framework," IEEE 1993, pp. 387-393.

Tadros, "Control System Design for a Three Degree of Freedom Virtual Environment Simulator Using Motor/Brake Pair Actuators", MIT Archive © Massachusetts Institute of Technology, Feb. 1990, pp. 1-88.

Mitsuishi et al. A Tele-micro-surgery System across the Internet with a Fixed Viewpoint/Operation Point, pp. 178-185.

Terry et al., "Tactile Feedback in a Computer Mouse," Proceedings of Fourteenth Annual Northeast Bioengineering Conference, University of New Hampshire, Mar. 10-11, 1988, pp. 146-149.

Goldberg et al. Desktop Teleoperation via the World Wide Web, IEEE International Conference on Robotics and Automation, 0-7803-1965, pp. 654-659.

Wies, Office Action mailed Mar. 30, 2009, U.S. Appl. No. 10/092,158.

Chang, Office Action mailed Jun. 11, 2009, U.S. Appl. No. 11/455,944.

United States Patent and Trademark Office, Office Action, U.S. Appl. No. 10/314,400, mailed Nov. 10, 2008.

United States Patent and Trademark Office, Office Action, U.S. Appl. No. 11/227,610, mailed Nov. 17, 2008.

United States Patent and Trademark Office, Office Action, U.S. Appl. No. 10/615,927, mailed Dec. 9, 2008.

United States Patent and Trademark Office, Office Action, U.S. Appl. No. 09/153,781, mailed Dec. 18, 2008.

\* cited by examiner

MECHANISMS FOR CONTROL KNOBS AND OTHER INTERFACE DEVICES

CROSS REFERENCE TO RELATED APPLICATIONS

This application is a divisional application of U.S. application Ser. No. 09/637,513, filed Aug. 11, 2000 now U.S. Pat. No. 7,038,667, which is a continuation-in-part of U.S. application Ser. No. 09/179,382, filed Oct. 26, 1998, issued on Nov. 28, 2000 as U.S. Pat. No. 6,154,201, and this application claims priority to U.S. Provisional Application Nos. 60/149,781, filed Aug. 18, 1999; 60/159,930, filed Oct. 14, 1999; and 60/182,557, filed Feb. 15, 2000, the entirety of all of which are incorporated herein by reference.

BACKGROUND OF THE INVENTION

This invention relates generally to knob control devices; and more particularly to control knob devices including force feedback and/or additional input functionality. Control knobs are used for a variety of different functions on many different types of devices. Often, rotary control knobs offer a degree of control to a user that is not matched in other forms of control devices, such as button or switch controls. For example, many users prefer to use a rotating control knob to adjust the volume of audio output from a stereo or other sound output device, since the knob allows both fine and coarse adjustment of volume with relative ease, especially compared to button controls. Both rotary and linear (slider) knobs are used on a variety of other types of devices, such as kitchen and other home appliances, video editing/playback devices, remote controls, televisions, computer interface controllers, etc. There are also many types of knobs that allow push-in or pull-out functionality to allow the user additional control over a device.

Some control knobs have been provided with force (kinesthetic) feedback or tactile feedback, which is collectively referred to herein as "haptic feedback." Haptic feedback devices can provide physical sensations to the user manipulating the knob. Typically, a motor is coupled to the knob and is connected to a controller such as a microprocessor. The microprocessor receives knob position and direction signals from the knob sensor and sends appropriate force feedback control signals to the motor so that the motor provides forces on the knob. In this manner, a variety of programmable feel sensations can be output on the knob, such as detents, spring forces, or the like.

One problem occurring in control knobs of the prior art is that the knobs are limited to basic rotary and/or push-pull motion. This limits the control options of the user to a simple device that does not allow a variety of selection options. Most mechanical knobs have a very limited feel, i.e., they do not have the ability to feel different depending on the interface context. In addition, if force feedback is provided on the knob, the limited control functionality of the knob limits the user from fully taking advantage of the force feedback to provide more control over desired functions. Furthermore, many of the well-known force feedback sensations are inadequate for dealing with some of the selection functions required from a knob, where often complex control over functions and options must be provided with limited knob motion.

SUMMARY OF THE INVENTION

The present invention provides a knob control interface that allows a user to control functions of a device in a variety of ways. Embodiments of the knob controller include mechanisms allowing additional degrees of freedom for the knob.

More particularly, in one embodiment a knob controller device of the present invention includes a knob rotatable in a rotary degree of freedom about an axis extending through the knob. The knob is also moveable in a lateral plane approximately perpendicular to the axis. A mechanism provides a particular lateral direction to the movement of the knob in the lateral plane. The mechanism can include a gate member and a plunger member. The plunger member engages one side of the gate member to provide the particular lateral direction. The mechanism can also include two slider members engaged to slide transversely with respect to each other and allow the movement in the lateral plane. A rotational sensor detects a position of the knob in the rotary degree of freedom and a lateral sensor detects a position of the knob in the particular lateral direction. Preferably, the gate member includes a plurality of grooves, each of the grooves corresponding with one of the predetermined lateral directions, where the plunger member engages one of the grooves. In some embodiments, the gate and plunger members are positioned offset from the axis extending through the knob, and second gate and plunger members are positioned on a different side of the axis, providing additional stability. In preferred embodiments, an actuator is coupled to the knob and outputs a force in the rotary degree of freedom about the axis.

Another embodiment of the present invention provides a novel actuator, or a device including such. A device including a user manipulandum, such as a knob, rotatable in a rotary degree of freedom about an axis of rotation and moveable linearly along the axis of rotation. An actuator coupled to the manipulandum outputs a force in the rotary degree of freedom about the axis, where the actuator includes a shaft that is coaxial with the axis of rotation. The shaft of the actuator can be moved linearly along the axis of rotation to accommodate the linear motion of the manipulandum. A rotational sensor detects a rotary position of the manipulandum and a sensor detects the linear motion of the manipulandum along the axis of rotation. The shaft of the actuator can be rigidly coupled to a rotor of the actuator such that the rotor and shaft can concurrently move linearly along the axis of rotation, where a stator of the actuator is grounded. Magnets of the stator can be extended to a length greater than a length of an armature of the rotor, such that the armature is always completely within a magnetic field of the magnets regardless of a position of the shaft along the axis of rotation. Commutator bars of the actuator can also be made a greater length such that brushes of the actuator are in continuous contact with the commutator bars regardless of a position of the shaft along the axis of rotation. A contact switch can detect when the user pushes the knob a predetermined distance.

In another embodiment of the present invention, a control device includes a manipulandum, such as a knob, to be physically contacted and manipulated by a user, the manipulandum able to be rotated about an axis of rotation and translated along the axis of rotation. A sensor detects the rotation of the manipulandum, and a gear assembly including two interlocked gears. The gears transmit the rotational motion from the knob to the sensor, and the interlocked gears translate with respect to each other when the knob is translated. An actuator can be included in the device to output a rotational force on the knob. In a similar embodiment, two components of a transmission move with respect to each other to allow the knob to translate axially, such as two interlocked gears or cylindrical frictional elements.

The present invention provides a control interface device that includes greater control functionality for the user. The linear and transverse degrees of freedom of the knob allow the user to select functions, settings, modes, or options with much greater ease and without having to take his or her hand off a manipulandum such as a knob. Force feedback may also be added to the manipulandum to provide the user with greater control and to inform the user of options and selections through the sense of touch. Actuator and transmission innovations allow the manipulandum to be moved in the additional degrees of freedom, and provide little play and friction, thus enhancing the force feedback embodiments of the present invention.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
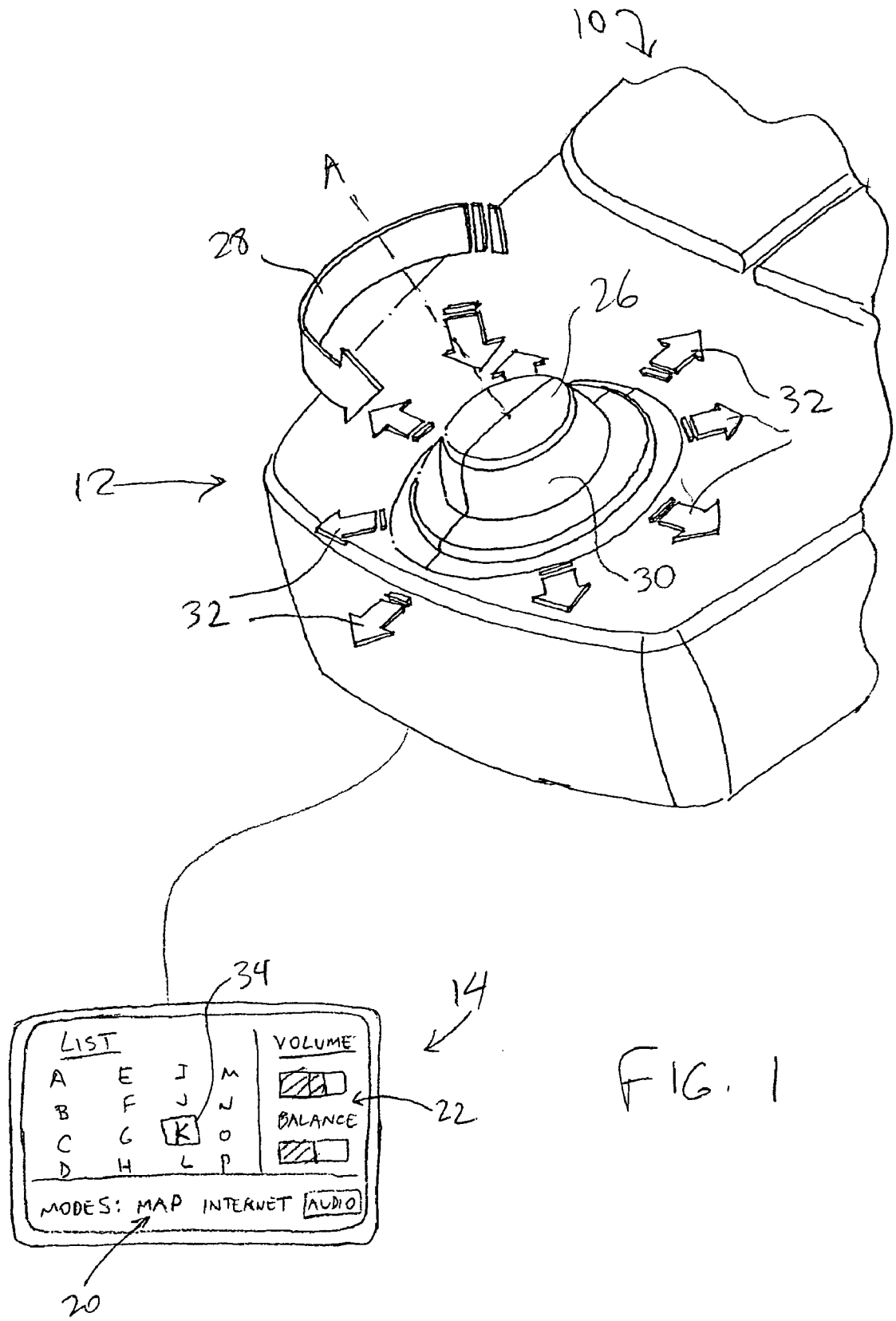
FIG. 1 is a perspective view of one embodiment of a device including a control knob of the present invention.

FIG. 1 is a perspective view of an example of a control panel 12 for an electronic device, the control panel including a control knob of the present invention. The control knob is manipulated by the user to control various functions of the device. In the described embodiment, the device is a controller for various automobile systems, e.g., a controller that controls audio output functions from speakers that are connected to the device, environmental functions for the automobile (air conditioning, heat, etc.), mechanical functions for adjusting and moving automobile components (mirrors, seats, sunroof, etc.), visual functions that can be used within the automobile (map display, vehicle status display, menu or list selection, web page display and navigation, etc.), and other functions, such as a security or alarm system for the automobile. For example, a common function of the device is to play sound from one or more media or signals, such as cassette tapes, digital audio transmission (DAT) tapes, compact discs (CD's) or other optical discs, or radio or other signals transmitted through the air from a broadcasting station or wireless network link. The device can include the ability to display information from and/or influence such other systems in a vehicle.

Alternatively, the controlled device can be a variety of other electronic or computer devices. For example, the device can be a home appliance such as a television set, a microwave oven or other kitchen appliances, a washer or dryer, a home stereo component or system, a home computer, personal digital assistant, cellular phone, a set top box for a television, a video game console, a remote control for any device, a controller or interface device for a personal computer or console games, a home automation system (to control such devices as lights, garage doors, locks, appliances, etc.), a telephone, photocopier, control device for remotely-controlled devices such as model vehicles, toys, a video or film editing or playback system, etc. The device can be physically coupled to the control panel 12, or the panel 12 can be physically remote from the device and communicate with the device using signals transferred through wires, cables, wireless transmitter/receiver, etc. The device can be used in an environment such as a vehicle, home, office, laboratory, arcade, hospital, or other setting.

The control panel 12 is accessible by the user to manipulate the functions of the controlled device. Panel 12 can be mounted, for example, on the interior of a vehicle, such as on or below the dashboard, on the center console of the automobile, or in some other convenient area. Alternatively, the panel 12 can be the surface of the external housing of the controlled device itself, such as a stereo unit.

A display 14 can be coupled to the controlled device and/or panel 12 to show information to the user regarding the controlled device or system and/or other systems connected to the device. For example, options or modes 20 can be displayed to indicate which function(s) of the device are currently selected and being adjusted through manipulation of the knob. Such options can include "audio," "map," "Internet," "telephone," power, etc., and selection of one mode can lead to a menu of sub-modes. Other information 22, such as the current audio volume, audio balance, radio frequency of a radio tuner, etc., can also be displayed. Furthermore, any information related to additional functionality of the device can also be displayed was a list of items from which the user can select by manipulating the control panel 12. In some embodiments, a map or similar graphical display can be shown on display 14 to allow the user to navigate the vehicle. In other embodiments, display 14 can be a separate monitor displaying a graphical user interface or other graphical environment as controlled by a host computer. Display 14 can be any suitable display device, such as an LED display, LCD display, gas plasma display, CRT, or other device. In some embodiments, display 14 can include a touch-sensitive surface to allow a user to "touch" displayed images directly on the surface of the display 14 to select those images and an associated setting or function. Control knob 26 allows the user to directly manipulate functions and settings of the device. Knob 26, in the described embodiment, is approximately a cylindrical object engageable by the user. The knob 26 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface. In addition, any of variety of differently sized knobs can be provided; for example, if high magnitude forces are output on the knob, a larger-diameter cylindrical knob is often easier for a user to interface with device. In the described embodiment, knob 26 rotates in a single rotary degree of freedom about an axis extending out of the knob, such as axis A, as shown by arrow 28. The user preferably grips or contacts the circumferential surface of the knob 26 and rotates it a desired amount. Force feedback can be provided in this rotary degree of freedom in some embodiments, as described in greater detail below. Multiple knobs 26 can be provided on panel 12 in alternate embodiments, each knob providing different or similar control functionality.

Furthermore, the control knob 26 of the present invention allows additional control functionality for the user. The knob 26 is preferably able to be moved by the user in one or more directions in a plane approximately perpendicular (orthogonal) to the axis A of rotation ("transverse" or "lateral" motion). This transverse motion is indicated by arrows 32. For example, the knob 26 can be moved in the four orthogonal and four diagonal directions shown, or may be moveable in less or more directions in other embodiments, e.g. only two of the directions shown, etc. In one embodiment, each transverse direction of the knob is spring loaded such that, after being moved in a direction 32 and once the user releases or stops exerting sufficient force on the knob, the knob will move back to its centered rest position. In other embodiments, the knob can be provided without such a spring bias so that the knob 26 stays in any position to which it is moved until the user actively moves it to a new position.

This transverse motion of knob 26 can allow the user to select additional settings or functions of the controlled device. In some embodiments, the additional control options provided by knob 26 allow the number of other buttons and other controls to be reduced, since the functions normally assigned to these buttons can be assigned to the knob 26. For example, the user can move a cursor 34 or other visual indicator on display 14 (e.g. pointer, selection box, arrow, or highlighting of selected text/image) to a desired selection on the display.

Besides such a cursor positioning mode, the transverse motion of knob 26 can also directly control values or magnitudes of settings. For example, the left motion of knob 26 can decrease a radio station frequency value or adjust the volume level, where the value can decrease at a predetermined rate if the user continually holds the knob 26 in the left direction. The right motion of the knob 26 can similarly increase a value. In another example, once one of the information settings is selected, a sub menu can be displayed and the directions 32 of knob 26 can adjust air temperature, a timer, a cursor on a displayed map, etc.

In another implementation, each of eight directions corresponds to a sub-menu category, and each lateral direction is only used for new menu selection, while knob rotation is used for selecting options within the selected menu. For example, categories such as "audio", "map", "temperature" and "cellular phone" can be provided in an automobile context and assigned to the lateral directions. Once the knob is moved in one of the lateral directions, the sub-menu category is selected and, for example, the knob can be rotated to move a cursor through a list, select a function and adjust a value, etc. Other control schemes can also be used. In one embodiment, the knob can travel a small distance laterally from the center position in each of the eight directions. Other travel distances can be implemented in other embodiments.

Different modes can also be implemented; for example, the default mode allows the user to control cursor 34 using the directions 32 of the knob. Once the cursor is located at a desired setting, such as the volume setting, the user can switch the mode to allow the directions 32 to control the setting itself, such as adjusting the value. To switch modes, any suitable control can be used. For example, the user can push the knob 26 to select the mode. In other embodiments, the user can push a separate button to toggle a mode, or some or all of the directions 32 can be used to select modes. For example, the down direction might switch to "volume" mode to allow the user to rotate the knob to adjust volume; the up direction can switch to "adjust radio frequency" mode, and the left direction can switch to "balance" mode (for adjusting the speaker stereo balance for audio output with rotation of knob 26).

In addition, the control knob 26 is preferably able to be pushed (and/or pulled) in a degree of freedom along axis A (or approximately parallel to axis A) and this motion is sensed by an axial switch or sensor. This provides the user with additional ways to select functions or settings without having to remove his or her grip from the knob. For example, in one preferred embodiment, the user can move cursor 34 or other indicator on the display 14 using the transverse directions 32 or rotation of the knob 26; when the cursor has been moved to a desired setting or area on the display, the user can push the knob 26 to select the desired setting, much like a mouse button selects an icon in a graphical user interface of a computer. Or, the push or pull function can be useful to control the modes discussed above, since the user can simply push the knob and rotate or move the knob while it is in the pushed mode, then release or move back the knob to select the other mode. The modes discussed above can also be toggled by pushing or pulling the knob 26. The push and/or pull functionality of the knob 26 can be provided with a spring return bias, so that the knob returns to its rest position after the user releases the knob. Alternatively, the knob can be implemented to remain at a pushed or pulled position until the user actively moves the knob to a new position.

The knob 26 is preferably provided with force feedback in at least the rotary degree of freedom of the knob. One goal of the tactile knob interface described herein is to allow the user to intuitively control several interface modes with a single haptic knob. That is, by adjusting the feel of the knob to clearly correspond to the context of the user interface, users may more easily navigate through complex menus and modes. For example, some interface modes may have the tactile feel of detents; while other modes may have the spring centered feel of a jog-shuttle. By providing familiar haptic metaphors, this variable feedback affords a cleaner, richer user experience.

Additional control buttons (not shown) or other control devices may also be provided on the panel 12 to allow the user to select different functions or settings of the device, including dials, knobs, linear slider knobs, hat switches, etc. Such additional controls may also be used in conjunction with the control knob 26 to provide additional selection and adjustment functionality.

In haptic knob implementations, when determining the desired force levels to be output on the knob 26, the strength of the stiffest haptic effect should be referenced. Given that the specific force levels vary with every effect, it has been assumed that a barrier effect (end stopping force in the rotation of the knob) will require the highest sustained torque levels. One method, which can be used, is to provide a momentary force level above the highest level that can be maintained, as described below with reference to the barrier force effect.

One embodiment of the present invention provides any of the implementations of the haptic knob described herein in conjunction with voice recognition and command functionality. Voice recognition/interpretation software/firmware can run on one or more processors of the device or interface, as is well known to those of skill in the art. Some types of functions can be very well suited for control with a combination of voice and haptic-enhanced touch. For example, a mode, such as audio mode, temperature control mode, etc., can be selected with voice. Then, however, the user can use the haptic knob to adjust a value of a function, such as a radio volume, a temperature setting, etc. This embodiment acknowledges that some selections or adjustments are easier to make with voice, while others are typically easier to make using a manual control. In addition, such an embodiment can optimize control over a device while diverting a user's attention from other tasks, such as driving, by a very small amount.

The actuator used is preferably designed to provide maximum torque while taking into consideration the voltage and current limitations of the power electronics and amplifiers driving the actuator. Often, strictly adhering to a minimum torque requirement may result in an "over-designed" knob; although it may be desirable to maximize torque to simulate stiff barriers, most effects can be communicated with much less torque. An intermediate torque level that represents a reasonable compromise of the various conflicting constraints of size, weight, torque and friction is often adequate for realistic force feedback.

The sensor used for the knob has two primary purposes: to provide position and direction information (and, in some embodiments, velocity and/or acceleration information) to a local or host processor in order to create realistic haptic effects (for those effects that are position based); and to communicate knob position information to the host computer or processor for selections and manipulation in the host-implemented environment. The haptic effects perform best when a high-resolution sensor is used, e.g. at least 1000 counts per full rotation. Since the knob is preferably a continuous rotational device having an infinite range of rotational motion, an encoder, rather than continuous turn potentiometer, is a suitable sensor due to the encoder's accuracy and lower errors when transitioning between maximum and minimum values. Other types of sensors can, of course, be used in other embodiments, including magnetic sensors, analog potentiometers, etc. In some embodiments, a high-amplification transmission can be used to provide greater resolution, such as a belt drive, capstan drive, etc., as described below with reference to FIG. 2.

Many different types of force effects and sensations can be output to the user using the knob mechanisms described herein, such as spring forces, damping forces, barrier forces, vibrations, detents, attractive forces, etc. Some basic force sensations are described in U.S. Pat. No. 5,734,373 and copending U.S. patent application Ser. No. 09/179,382, both incorporated herein by reference.

Knob Mechanism Implementations

Several knob mechanism embodiments are described below. It should be noted that the embodiments described below are not the only embodiment of the present invention. For example, some embodiments may only include the transverse motion of knob 26 and not the push and/or pull functionality nor the force feedback functionality. Yet other embodiments may only include force feedback with transverse knob motion, or force feedback with push and/or pull functions.

Figure 2:
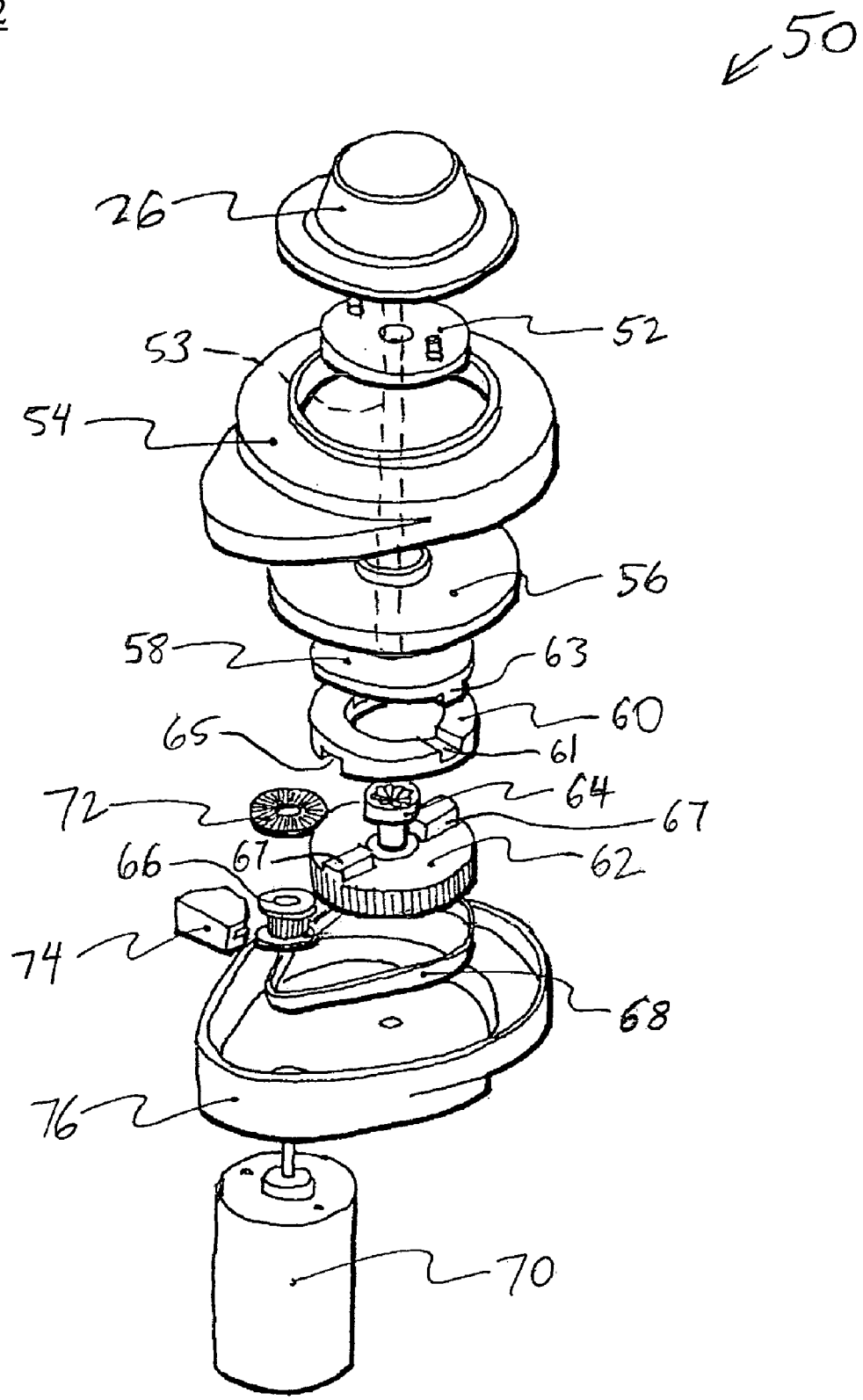
FIG. 2 is a perspective view of one embodiment of a mechanism for implementing the control knob device of the present invention.

FIG. 2 is a perspective exploded view of a first embodiment 50 of the mechanism of the control knob 26 of the present invention, which can also provide haptic feedback to the user. Embodiment 50 utilizes a belt transmission for improved torque, e.g., a 4 to 1 synchronous belt transmission can be achieved in one implemented embodiment. This is beneficial for generating effects with stiff end-stop effects.

The control knob 26 moves a vertical shaft or axle 53, which extends through a switch plate 52, a top case 54, a top slider 56, top clutch 58, and mid-clutch 60. A parallel misalignment clutch, formed of top clutch 58, mid-clutch 60, and a bottom clutch 62, allows an actuator and grounded portion of the knob mechanism to stay fixed while the knob 26 can be moved laterally. The vertical shaft 53 is rigidly coupled to the switch plate 52 at one end and the top clutch 58 at the other end, and the shaft acts as a guide for the linear axial motion of the knob. Apertures in knob 26 are mated to pegs extending from the switch plate 52, allowing the knob to provide torque on the plate 52 but permitting the knob to move axially with respect to the plate 52. The mid-clutch 60 includes slots 61 which mate with keys 63 of top clutch 58 and allow the knob to be moved in one lateral degree of freedom (two directions). Similarly, the mid-clutch 60 includes two different slots 65 spaced at 90 degrees from the first notches which mate with keys 67 provided on bottom clutch 62 and allow the knob to be moved in the other lateral degree of freedom. The lateral degrees of freedom provided by knob 26 are "true" lateral degrees of freedom, i.e., the knob slides linearly transversely and does not approximate lateral motion by pivoting the knob rotationally. Such true lateral motion tends to feel better when a relatively longer travel distance in the lateral directions is provided.

A rounded portion or plunger (not shown) is provided at the end of the vertical shaft extending down from the knob 26 and engages a gate 64 centered on the axis of rotation and having a number of grooves that constrain the knob to the desired 8 lateral directions, similar to the gate and plunger described below with reference to FIG. 3b. In other embodiments, the gate can include less or a greater number of grooves for a different number of allowed transverse directions of the knob. The components 26, 52, 56, 58, 60, and 62 are either coupled to or engaged with at least one other of these components so that when any one of these components is rotated (such as knob 26), all these components are rotated in unison. Sensors (not shown) are also preferably included to detect motion of the knob in the lateral directions. Such lateral sensors can be any of standard sensors used for detecting motion, such as optical sensors, Hall effect sensors, contact switches, stick controller switches, etc. For example, the lateral sensors can be contact switches positioned near the circumference of top slider 56 spaced at 90 degrees; when the slider 56 is moved laterally with the knob, one or two of the contact switches is closed in the path of the knob.

A drive pulley 66 is connected to the bottom clutch 62 by a belt 68, and the drive pulley is coupled to a drive shaft of a grounded actuator 70, such as a DC motor, moving magnet actuator, voice coil, passive brake, or other type of actuator. The actuator 70 thus rotates drive pulley 66 (or causes resistance to rotation if actuator 70 is a brake), which rotates the bottom clutch 62 and the knob 26. An encoder disc 72 can be coupled to drive pulley 66 and rotates in unison with the drive pulley 66. The encoder disc 72 includes an edge that is rotated within an encoder optical sensor 74 to allow determination of the knob rotational position by a microprocessor or other controller by sensing passage of marks or slots on the wheel. A bottom case 76 can be positioned between the actuator 70 and the drive pulley 66, where the bottom case 76 attaches to the top case 54 to form a housing around most of the other components.

The knob 26 is able to be linearly moved axially with respect to the switch plate 52, e.g. the knob can mate with the switch plate with pegs as shown. A contact switch (not shown) can be positioned on the switch plate 52 to detect when the knob 26 is pushed against the plate 52. The inherent spring in the mechanical switch can provide a spring return force on the knob to maintain it in the "up" position when no force from the user is provided. Other types of sensors and/or additional springs can also be used.

One benefit of the mechanism 50 is the location of the encoder 72 and 74 relative to the knob 26. The belt drive transmission amplifies the knob rotation and affords an increase in encoder resolution, e.g. one rotation of the knob 26 provides multiple rotations of the encoder wheel 72. Other types of transmissions can be used in other embodiments to amplify resolution and force output; for example, capstan cable drives, gears, friction wheels, and o-ring or timing belt drives can be used.

Other advantages of the embodiment 50 include a high holding torque, very scalable mechanical design, a smaller/less expensive actuator due to the use of transmission amplification, and improved encoder resolution due to the drive transmission amplification. There are some disadvantages as well: the mechanism requires significant depth in a housing to house it; there is friction inherent in the belt transmission; the drive transmission increases the device's complexity; and more joints in the moving parts result in greater backlash in the device. Furthermore, this embodiment is not as suitable for the axial-moving motor shaft invention described herein as other embodiments.

In another alternate embodiment, one or more of the transverse or lateral motions of knob 26 can be actuated. For example, a linear or rotary actuator can be provided to output forces in the transverse degree of freedom, in one or both directions (toward the center position and away from the center position of the knob). For example, one or more magnetic actuators or solenoids can be used to provide forces in these transverse directions. Similarly, in other embodiments, the pull and/or push motion of knob 26 along axis A can be actuated. For example, a jolt force can be output on the knob in the linear degree of freedom along axis A as the user pushes the knob. Also, the spring return force provided by spring member 64 can instead be output using an actuator controlled by a microprocessor.

Figure 3A:
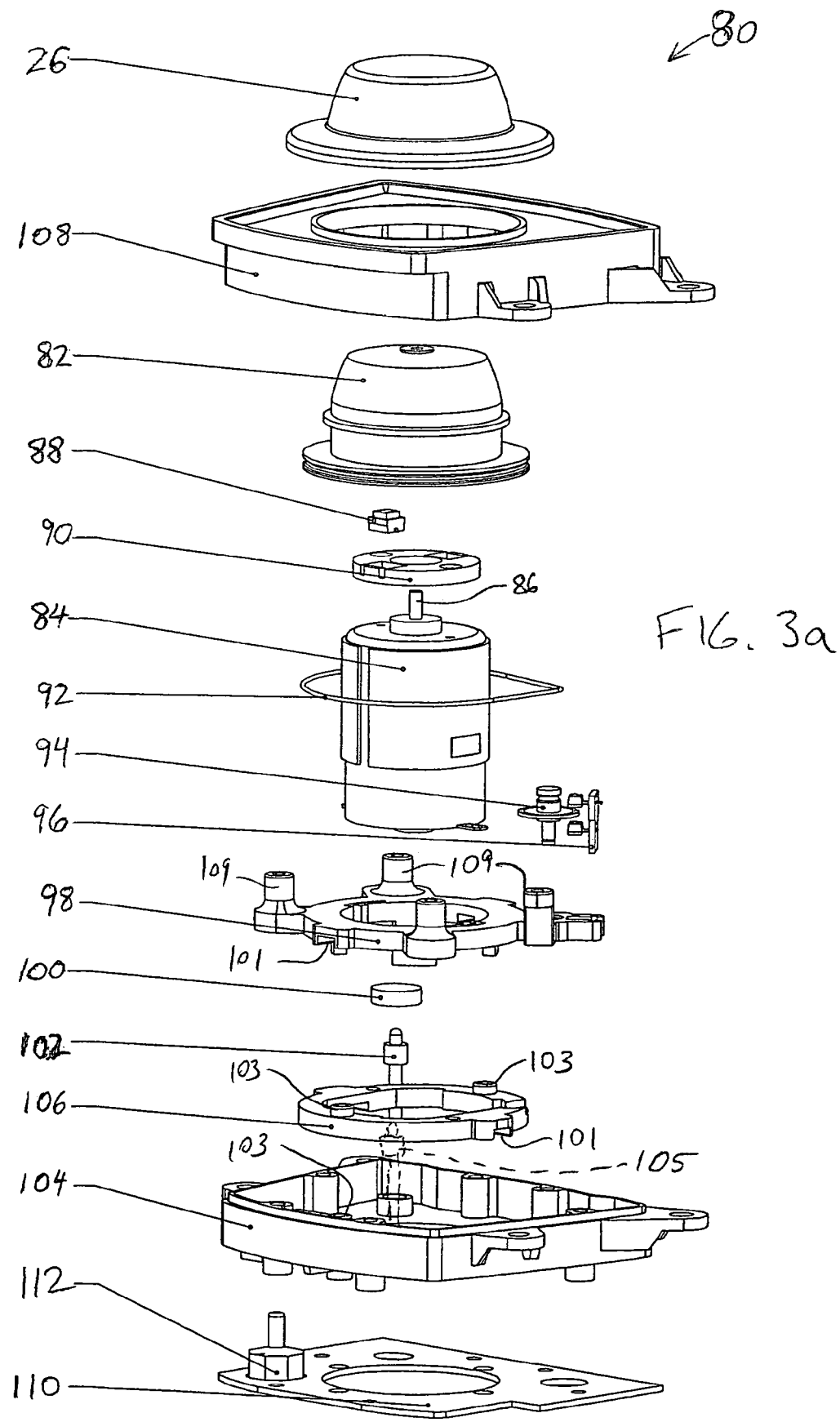
FIG. 3a is a perspective view of a second embodiment of a mechanism for implementing the control knob device of the present invention.

FIG. 3*a* is an exploded perspective view of a second embodiment 80 of a mechanism for the knob 26. Mechanism 80 implements a direct drive motor for reduced friction and higher fidelity. This design has no transmission or clutch components, unlike the embodiment 50 of FIG. 2, and thereby eliminates the effects of both backlash and friction. However, this generally results in a lower torque output and sensing resolution than the embodiment of FIG. 2. The reduced torque output of this design may make the use of current control algorithms that permit short durations of higher-level currents more suitable.

Knob 26 that is contacted by the user is directly coupled to a knob pulley 82, which is in turn directly coupled to a rotating shaft 86 of an actuator 84, similar to the actuator 70 of FIG. 2. A select switch 88 is provided in a switch bracket 90 provided between knob pulley 82 and motor 84; the select switch 88 is closed by the pulley 82 when the user pushes on the knob and moves it linearly along the axis of rotation so that the controlled device can detect when the knob is pushed. One example of the select switch is described in greater detail with respect to FIG. 7. A spring centering force on the axial motion of the knob is preferably provided by the select switch 88.

An encoder drive belt 92 is coupled to the knob pulley and drives an encoder pulley disk 94, which is rotated between an emitter and detector on a grounded encoder printed circuit board (PCB) assembly 96. A top slider 98 is positioned around the housing of actuator 84 and includes a gate 100 facing down, which is mated with a plunger 102. The gate 100 and plunger 102 are described with reference to FIG. 3*b*. The plunger 102 is preferably spring loaded in an aperture in the bottom case 104, and a bottom slider 106 is positioned between the bottom case 104 and the top slider 98. The bottom slider 106 and top slider 98 slide transversely with respect to each other to allow the knob 26 and actuator 84 to together be moved in eight lateral directions (perpendicular to the axis of rotation of the knob). The engagement of slots 101 and keys 103 in the slider members and in the bottom case 104 allow this transverse motion, where the slots and keys permit transverse motion. The plunger 102 and gate 100 interaction, as detailed below, also confines the knob to desired lateral directions.

The plunger 102 and gate 100 are offset from the center axis of rotation of the mechanism, unlike the gate and plunger of embodiment 50 of FIG. 2. In some embodiments, the offset nature of these components can introduce some rotational play of the knob about the center of the gate. In such embodiments, it is preferred that a second gate (not shown) and spring-loaded plunger 105 be provided on the opposite side if the sliders 98 and 106 to the existing gate and plunger to provide greater stability and less play and vibration in the mechanism. In a preferred embodiment, only one of the gates includes grooves for guiding purposes; the other gate can have a smooth, concave or cone-shaped underside.

A top case 108 can be positioned under the knob 26 and can be coupled to the bottom case 104 to provide a housing around much of the mechanism. In a preferred embodiment, the top slider 98 includes rounded surfaces on projecting members 109, where the rounded surfaces contact the underside of top case 108 to provide stability for the sliding lateral motion of the knob mechanism.

A main PCB assembly 110 can be used to hold circuitry and other needed electronic components for the mechanism 80. In addition, a lateral sensor for sensing the motion of the knob in the eight lateral directions can take the form of a compact stick controller 112. Controller 112 includes a base that is coupled to the grounded PCB assembly 110 and a stick portion that extends into a receptacle in the top slider 98. As the top slider 98 moves in the eight lateral directions, the stick of the controller 112 moves in corresponding directions and a sensor within the controller 112 senses this motion. In other embodiments, other types of sensors can be used for lateral sensors, such as optical beam sensors, contact switches or sensors, Hall effect sensors, optical encoders, etc.

Advantages of the embodiment 80 include low friction, which leads to a smooth feel of forces and the knob; this is due to the actuator 84 directly driving the knob 26 without any drive transmission. In addition, a high sensing resolution is obtained due to the belt drive transmission (including belt 92) that is used with the encoder that one rotation of the knob to several rotations of the encoder wheel 94. The mechanism is also simpler than the embodiment of FIG. 2 and requires less space within a housing, which is advantageous in such space-limited locations as an armrest console in an automobile or other vehicle. Furthermore, the embodiment 80 may be directly used with the axial moving shaft motor invention described with reference to FIG. 6. Disadvantages include less holding torque, and the device may require more sophisticated (and therefore expensive) electronics to monitor motor temperature.

Figure 3B:
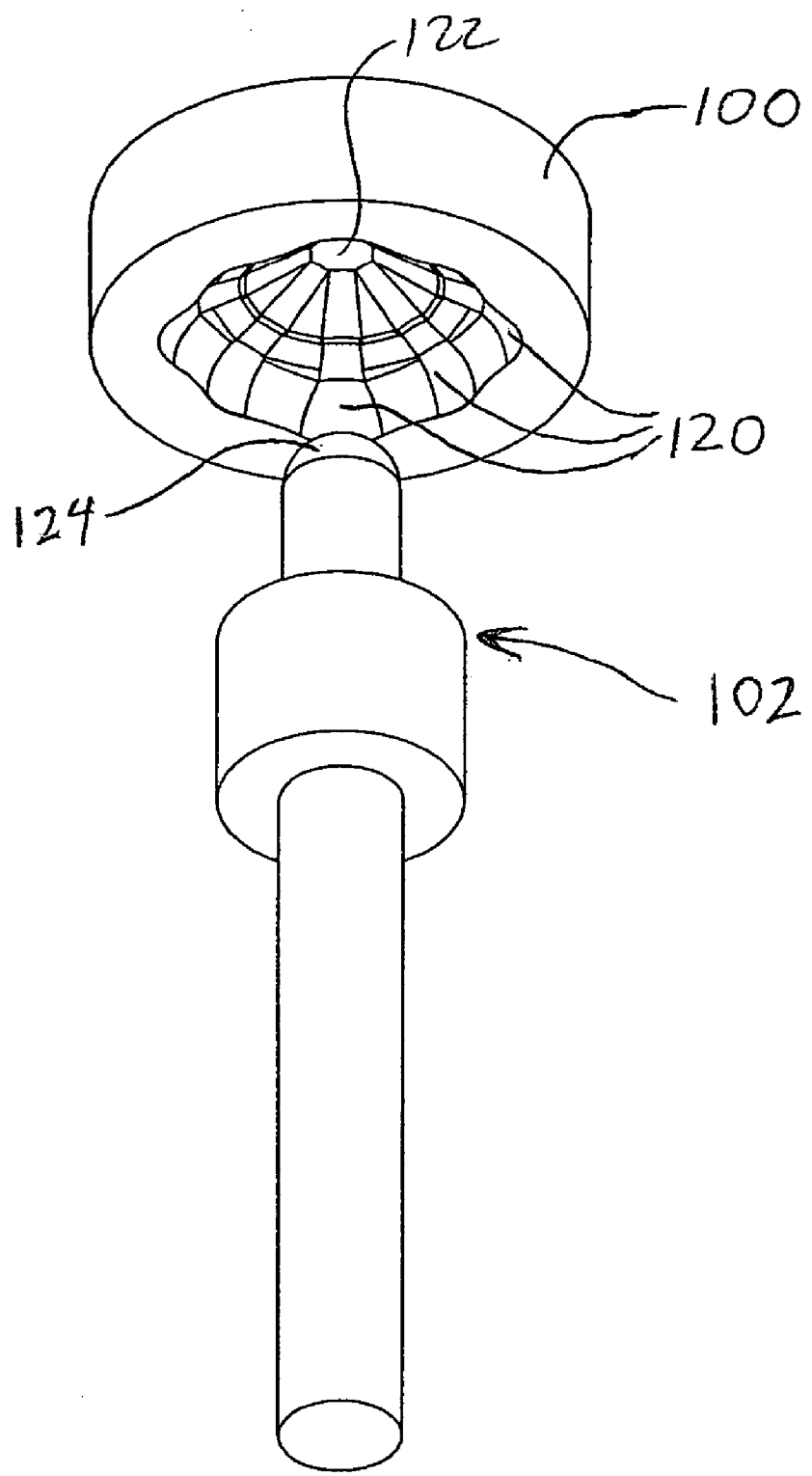
FIG. 3b is a perspective view of a gate and plunger mechanism that can be used in the inventive embodiments of the control knob.

FIG. 3*b* illustrates the gate 100 and plunger 102 of the embodiment of FIG. 3*a*. Gate 100 includes a concave underside and a number of grooves 120 bored in the underside and oriented in a radial fashion from the center of the underside of the gate. The gate 100 is oriented such that a tip 124 of the plunger 102 is contacted with the grooves, i.e., pressed within one of the grooves or the center cup 122 between the grooves. The grooves 120 are provided in the directions desired for lateral travel of the knob 26. Thus, if eight directions are desired, eight different grooves in the desired directions are provided. The plunger 102 is preferably spring-loaded so as to provide good contact between plunger 102 and gate grooves 120 at all times and to better enable the guiding function of the gate.

In operation, the gate 100 moves with the knob 26 and actuator 84 when the user moves the knob 26 in a lateral direction. The grounded plunger 102, engaged with the gate 100 within a groove 120, forces the gate 100 to be moved so that the plunger 102 remains in one of the eight grooves 120. Thus, the gate is allowed to moved only in one of the eight desired directions, which in turn forces the knob 26 to be moved in one of those eight lateral directions.

Figure 3C:
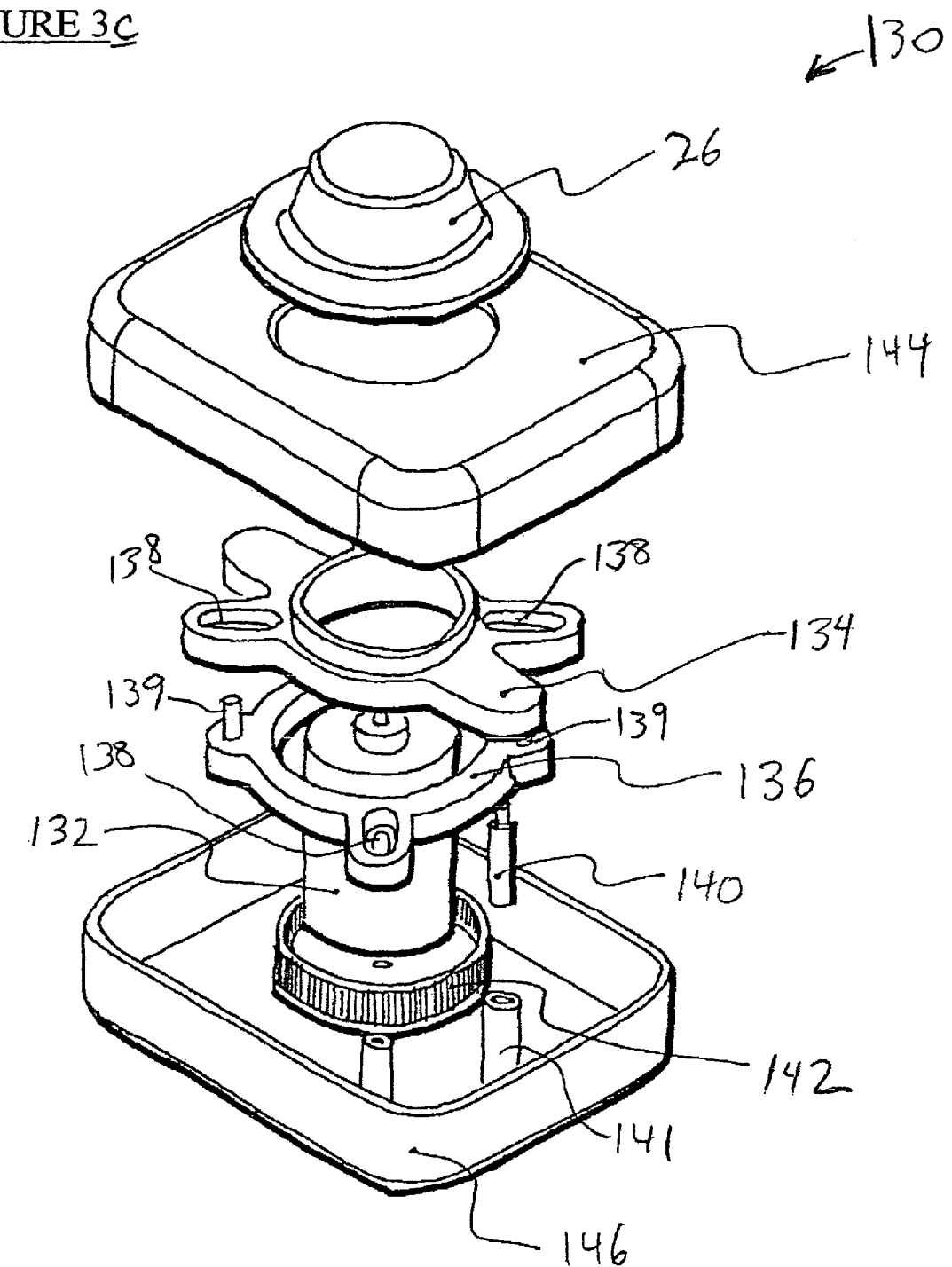
FIG. 3c is a perspective view of a third embodiment of a mechanism for implementing the control knob device of the present invention.

An alternate embodiment 130 of embodiment 80 is shown in FIG. 3c, which provides a different sensing mechanism for the knob mechanism. Similar to the embodiment 80, the knob 26 is directly coupled to the drive shaft of an actuator 132. A 10 top slider 134 and bottom slider 136 are provided to allow the lateral motion of the knob in eight directions, where apertures 138 in the sliders allow the sliders to slide with respect to posts 139 extending through the apertures. A ball button 140 is grounded in post 141 and extends upwardly to engage with a gate in the bottom of slider 136, similar to the gate and plunger shown in FIGS. 3a and 3b, to constrain the motion of the knob to the desired lateral directions. Since the gate and plunger are offset from the central axis of rotation, similar to the embodiment of FIG. 3a, a second plunger and (preferably nongrooved) gate can be provided at the opposite side of the mechanism to provide stability and a tighter motion.

An encoder disc 142 is mounted to the bottom of the actuator drive shaft. The encoder disc apertures or marks are vertically (axially) oriented to allow sensing of the knob position during travel of the encoder disc with respect to a sensor such as an emitter/detector (not shown), i.e., at all axial linear positions of the knob. For example, a thin band of marks or apertures can be provided, with an emitter and detector for detecting passage of the apertures or marks. Thus, this embodiment can be suitable for those embodiments providing axial knob travel in which the sensor (and the actuator, in some embodiments) moves with the knob axially. In other embodiments, instead of apertures or marks on a thin band, a transparent, ridged material can be used in the sensor, where the detector detects changes in the emitted beam from passage of the ridges. For example, Kärna of San Francisco, Calif. provides an optical sensor having approximately sawtooth-shaped ridges that function similarly to marks or apertures, but which allow a circular band to be more easily formed, and which can be suitable for the present invention. Since no drive transmission is used, the sensing resolution of the embodiment 130 is generally smaller than the embodiment 80. A top case 144 is coupled to a bottom case 146 to provide a housing around the mechanism.

Figure 4A:
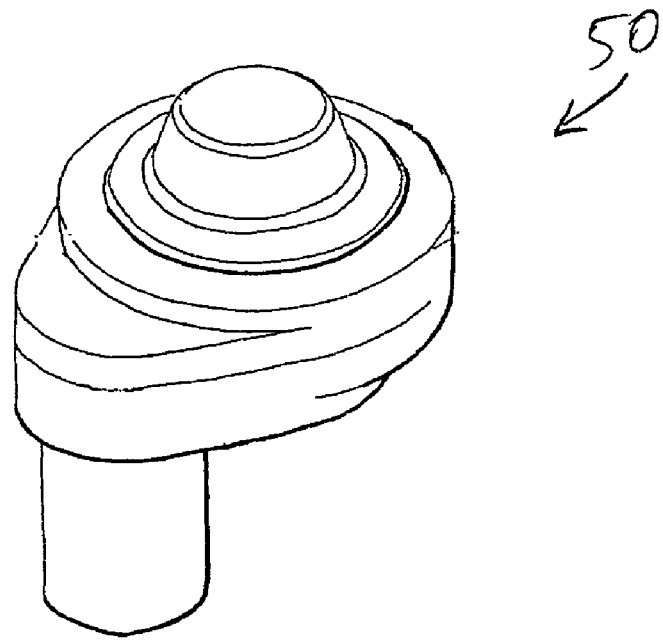
FIGS. 4a and 4b are perspective views of the control knob devices in a housing.

FIG. 4a is a perspective view showing one example of the assembled haptic knob mechanism 50 of FIG. 2 and it volume constraints. The haptic knob can be used in a vehicle, such as on the front section of a center armrest of an automobile, or on a central console. The embodiment 50 shown in FIG. 2 provides sufficient torque, but because of the belt drive transmission, is larger in size than the embodiment 80. Embodiment 50 can utilize the original volume below and behind the knob for the actuator, as shown in FIG. 4a.

Figure 4B:
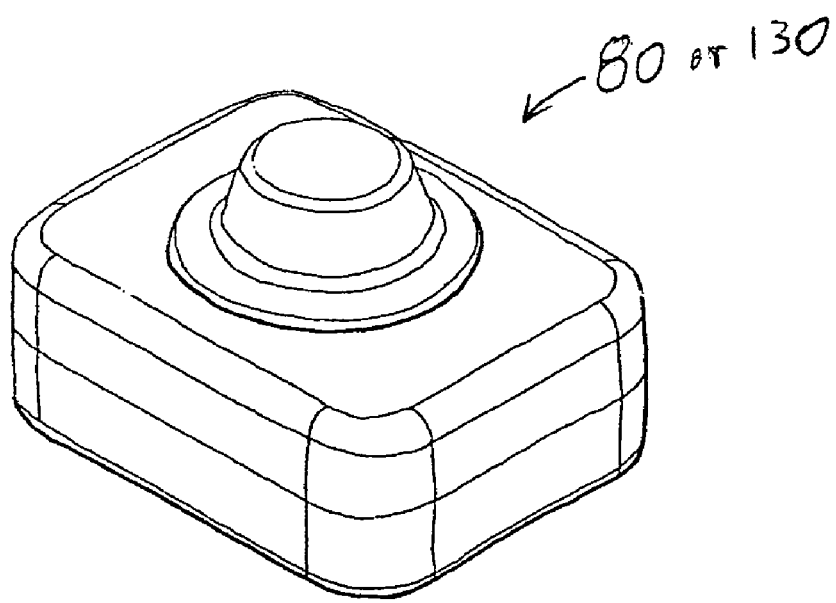

FIG. 4b is a perspective view showing another example of the assembled housing, which can be used for the embodiment 80 of FIG. 3a or the embodiment 130 of FIG. 3c. Embodiment 80 or 130 requires slightly more lateral volume than the embodiment 50, but only a shorter assembly is needed as it does not implement a transmission, as shown in FIG. 4b. Of course, in other embodiments in which the knob is controlling other devices in other contexts, such volume constraints may not be present, or different constraints may exist.

Axial Knob Movement

Implementation of the axial translation of the knob or other manipulandum can take different forms. One aspect of the present invention includes a motor (or other type of actuator) having a shaft that may be moved along the axis of rotation of the motor shaft. This design greatly aids in the tactile knob of the present invention since it allows the knob to translate along the axis of rotation without the use of any couplings.

Typically, if such knob movement were desired, an expensive axial coupling device, such as a bellows, a helical flexible coupling, or a splined shaft inside of a splined cavity, was provided between the moving knob and the motor shaft, such as in the embodiment of FIG. 8, described below. This allowed the knob to move axially with respect to the motor shaft yet still allowed the motor to exert rotational force on the knob. However, the coupling is expensive and may introduce backlash or compliance into the system, decreasing the realism of the output forces to the user. Alternatively, previous systems could move the entire motor along the axis of rotation of the knob; this is often inefficient, however, since the motor is typically heavy and bulky (especially a stator portion including permanent magnets).

Figure 5:
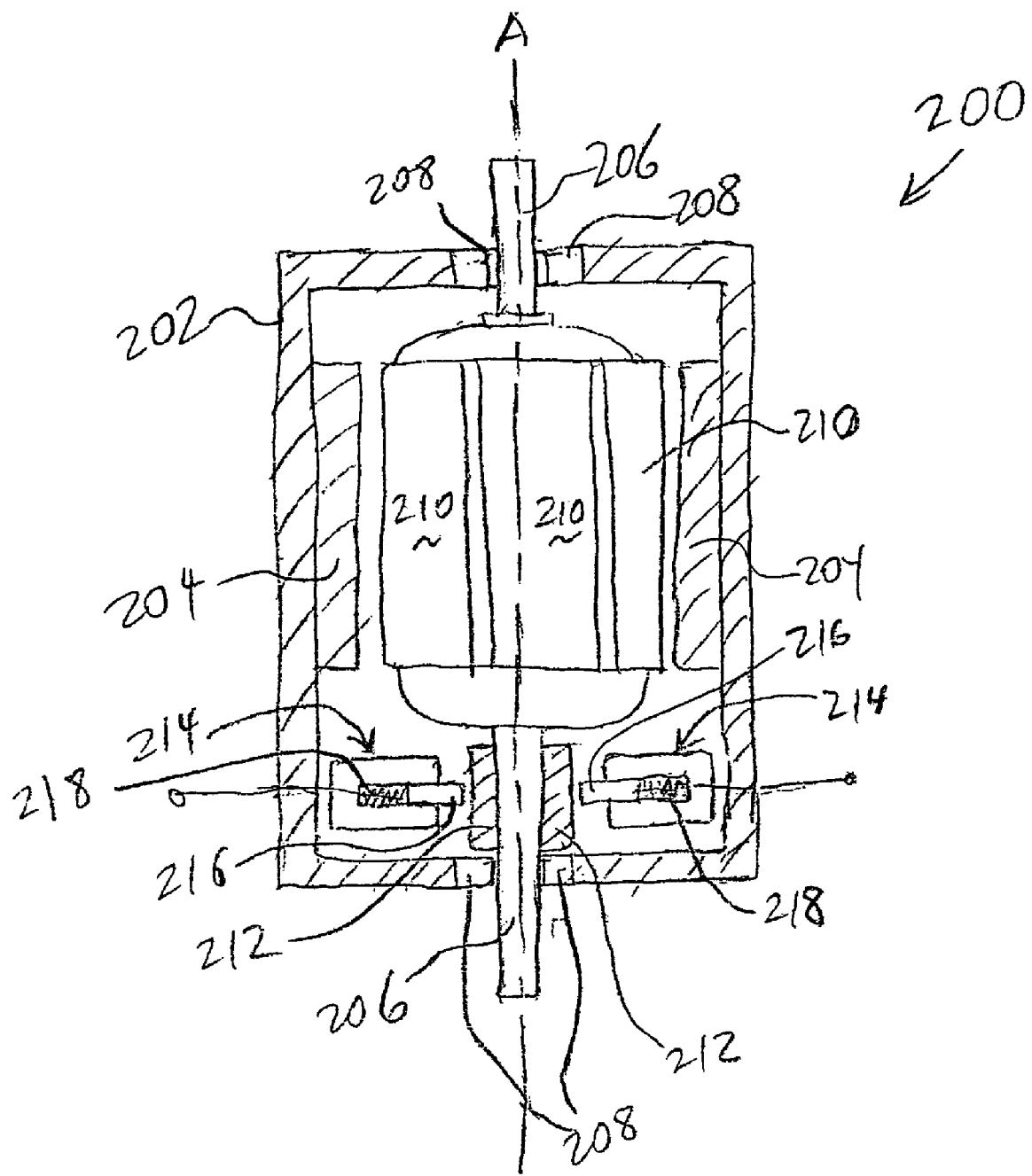
FIG. 5 is a side cross-sectional view of a prior art motor and interior components.

An example of a motor 200 of the prior art is shown in the side cross-sectional view of FIG. 5. A common DC brush-type motor is shown, having stationary portions (stator) with respect to the motor housing and a rotating portion (rotor). A housing 202 of the motor is typically cylindrical and provides a support for the stator of the motor and also functions as a magnetic flux guide. Housing 202 includes two magnets 204 coupled to the inside of the housing, which are typically provided on opposing sides of the interior of the housing. Magnets 204 typically have opposite magnetic poles to each other facing inward toward the center of the housing (e.g., a north face N of one magnet faces inward, and a south face S of the other magnet faces inward). Shaft 206 of the rotor is rotatably coupled to housing 202 so that the rotor may rotate about axis A. For example, bushings 208, such as ball bearings, can hold the shaft 206. The rotor also includes an armature having a number of teeth 210 having supports, about which are wrapped a conductive wire or coil (not shown).

In a brush-type motor, the shaft 206 is coupled to a number of commutator bars 212 positioned cylindrically about the shaft 206, and to which the coils are connected. Brush units 214 are conductively coupled to the commutator bars; for example, brushes 216 can be spring loaded against the commutator bars by helical or leaf springs 218. Current is supplied to a brush 216, which conducts the current to a commutator bar, through the coil, and out through the other commutator bar 212 and brush 216.

As is well known to those skilled in the art, permanent magnets 204 create a static magnetic field, which interacts with a variable magnetic field produced by electric current flowing through the coil of the rotor. The magnetic fields are directed through the stator and rotor commonly using ferrous structures, such as iron. The rotor rotates about axis A within housing 202 in a direction determined by the direction of the current through the coils. The shaft 206 is fixed in the degree of freedom along the axis A and is not allowed to translate.

Figure 6:
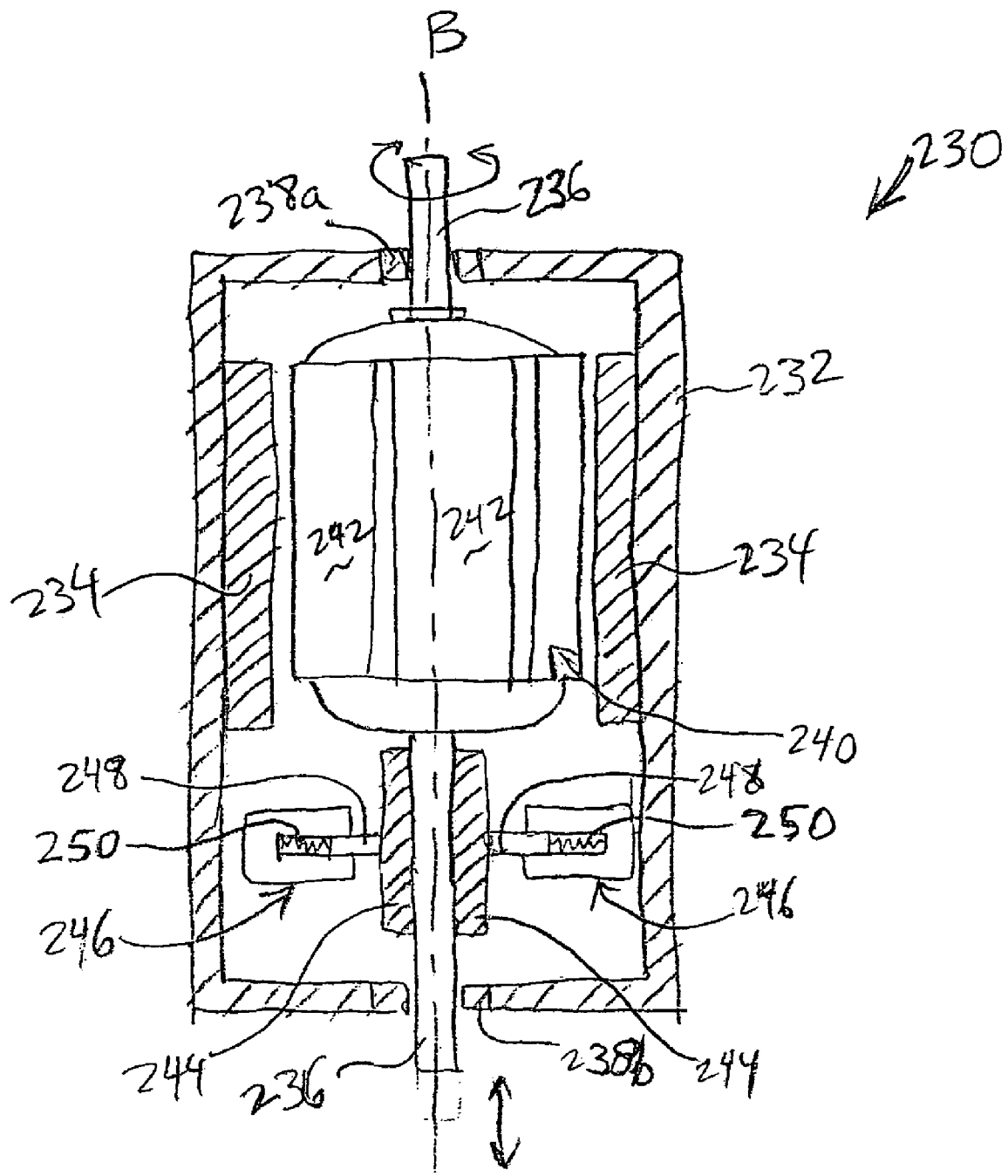
FIG. 6 is a side cross-sectional view of a motor of the present invention allowing the shaft of the motor to translate axially.

FIG. 6 is a side cross-sectional view of an example of the motor 230 of the present invention. As in FIG. 5, a DC brush-type motor is shown, although other types of motors or actuators can also be provided with the features of the present invention. Instead of providing an axial coupling device between knob and motor, the axial compliance is built into the motor 230.

Like the motor of FIG. 5, motor 230 includes a stator that includes housing 232 and magnets 234. A rotor is positioned in the housing held by bushings 238 and includes shaft 236 and armature 240. Armature 240 includes teeth 242 and a coil, as described above. Teeth 242 may be positioned parallel to the sides of the housing 232, or may be skewed in a helical arrangement to reduce a "cogging7" effect that is caused by the magnetic fields and transmitted to the user when the rotor is rotated. Such skewed rotor implementations are described in U.S. Pat. No. 6,050,718.

Motor 230 also includes commutator bars 244 coupled to the rotor and brush units 246 coupled to the stator, the brush units including brushes 248 and spring elements 250, which can be leaf springs, helical springs, flexures, or other types of compliant elements.

The entire rotor is able to be translated along the axis B of rotation in the present invention, allowing the shaft 236 to move along the axis B and providing the necessary movement to the knob (or other user manipulatable object) that is coupled to the shaft. To accommodate this motion, some of the components of the actuator have been modified. The clearance between the commutator bars 2441 brush units 246 and the rear bushings 238b has been increased to accommodate the motion of the rotor. In some embodiments (depending on the amount of axial translation), the commutator bars 244 should be extended to guarantee continuous contact between the brushes 248 and the commutator bars 244 at all positions of the rotor. If large brushes are used, the brushes 248 can be shortened along the axis B to alternatively (or additionally) accommodate the axial motion of the rotor.

The magnets 234 also can be extended as shown in FIG. 6, e.g. extended toward the brush units in the example shown, so that the armature is within the magnetic field of the magnets 234 at all positions in the range of axial motion of the rotor. If a portion of the armature were allowed to extend out from the magnets 234, a loss in torque or efficiency of torque output may result. Bushings 238 are preferably a high quality type of bearing, such as bronze bushings, that maintain quality over a long period of time despite wear from the axial translation of the shaft 236.

If a knob is coupled directly to the shaft 236, the axial motion of the rotor allows the knob to be sensed in a linear degree of freedom parallel to axis B of the motor. Furthermore, torque can be output on the knob directly by rotating the shaft 236, providing compelling tactile sensations to the user without the use of a compliant coupling. In addition, the changes to an off-the-shelf motor required by the present invention are simple and inexpensive, allowing motors of the present invention to be easily manufactured.

Alternate embodiments can provide other implementations for allowing the shaft 236 to move axially with respect to the other portions of the motor 230. For example, the shaft 236 can be axially translated with respect to both the rotor and the stator of the motor, which remain stationary with respect to ground or a reference surface. In such an embodiment, the shaft 236 can be moved axially within a slot that is provided in the center of the armature 240. To allow the shaft 236 to be rotated by the armature, a keyed feature or other engaging mechanism can be used. For example, a cylindrical shaft and aperture can provide a key in one that engages a slot in the other portion. Or, a hexagonal or other multi-sided cross section of the shaft can engage a similarly shaped aperture. However, such solutions may not be as desirable in low-cost devices as the embodiment shown in FIG. 6, since they may require significant alteration to designs of existing motors. A spring return force on the shaft 236 preferably biases the shaft to the extended position. This spring return force can be either internal and/or external. For example, there is an inherent return force provided on the rotor relative to the magnets due to the magnetic properties. External components such as springs can be used as well.

Figure 7:
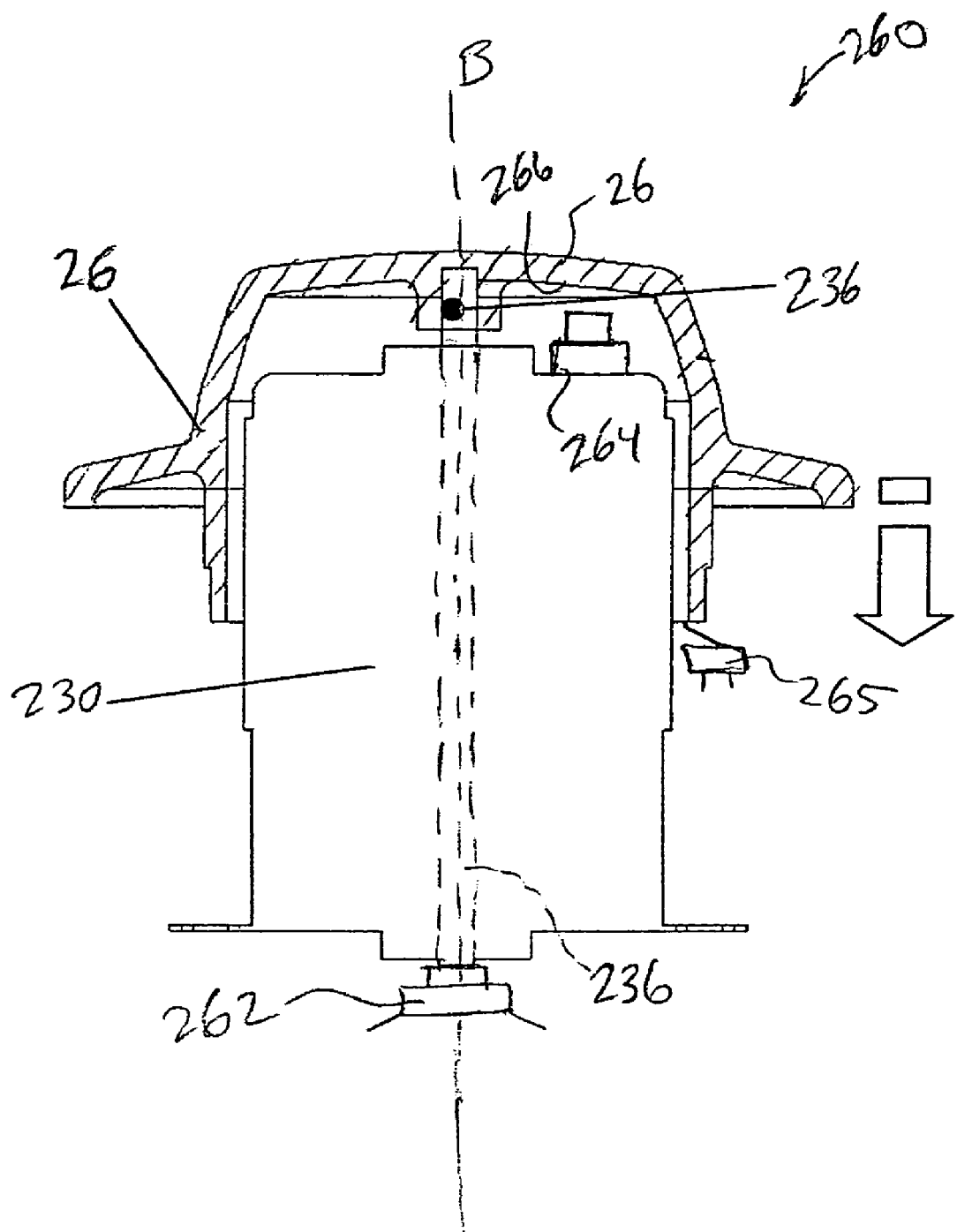
FIG. 7 is a side cross sectional view of the motor of FIG. 6 and a knob and switch to detect the axial motion of the knob.

FIG. 7 is a side cross sectional view of a device 260 including the motor 230 and a knob 26 coupled to the motor. For example, the embodiment 80 of FIG. 3a can be used with the actuator 230, or the embodiment 50 of FIG. 2. The axially moving output shaft 236 of the motor 230 is rigidly coupled to the knob 26 so that the knob 26 is rotated when the shaft 236 is rotated. The knob 26 may also be translated along axis B; in the embodiment shown, the knob may be moved downward a total distance of 1.5 mm from the topmost position shown. In other embodiments, other distances can be provided.

The device 260 also preferably includes one or more sensors for detecting at least one position of the knob 26 in its linear axis. In the example of FIG. 7, the sensor is a switch 262, which is positioned at the opposite end of the motor 230 to the knob 26. The switch is a contact switch that closes when the shaft 236 presses down on the switch, which is caused by the user pressing the knob 26 down the requisite distance. The switch is coupled to a microprocessor or other controller, which thus can detect when the user is pressing the knob to make a selection or otherwise influence the operation of the controlled device. The switch 262 can also be implemented as other types of sensors or switches in other embodiments, such as an optical sensor, a magnetic sensor, a pressure sensor, or other type of sensor or switch.

In other embodiments, the switch can be positioned in other locations of the device 260. For example, a switch 264, which is similar to the switch 262, can be positioned on the top surface of the housing of the motor 230 and underneath the knob 26. When the knob 26 is pushed down by the user, the bottom surface 266 of the knob contacts the switch 264 to close the switch. Multiple switches 262 and 264 can also be used; for example, two switches 264 can be positioned on the top surface of the motor 230. In other embodiments, a switch can be positioned in other locations, such as switch 265.

In some embodiments, the position of the knob (or shaft) in the axial direction can be sensed using a continuous-range or analog sensor, and the linear axial position can used by a microprocessor (or other controller) to provide proportional control over a value, computer generated object, or other device function. In some embodiments, the movement parallel to axis B can also be actuated using, for example, a frictional roller actuator or linear actuator, allowing different force sensations to be output in the linear degree of freedom, such as springs, damping, inertia, detents, textures, vibrations, jolts or pulses, etc.

Although the embodiments disclosed herein are in reference to rotary knobs, other rotating user manipulatable objects can be coupled to the translating actuator shaft of the present invention. For example, a joystick, steering wheel, pool cue, medical instrument, or other grip can be provided instead of a knob.

In other embodiments, a sensor can be provided to sense a range of positions of the knob 26 or a continuous motion of the knob 26 linearly along axis B. For example, a Hall effect switch can be provided on the knob or an attached member, which measures the position of the shaft 236 relative to a grounded magnet. Or, an optical sensor (such as a photodiode) or other type of sensor can detect the position of the shaft 236 and/or knob 26. In such an embodiment, the position of the knob along axis B can proportionately control a cursor position or function or setting of the controlled device. For example, such movement can control the volume of audio output of the device, motion of a cursor across a display, or the brightness of lights inside a vehicle.

A spring member can also be coupled between the knob and a grounded surface to provide a restoring force to the knob and to bias the knob to an origin position when the user removes sufficient pressure from the knob.

Figure 8:
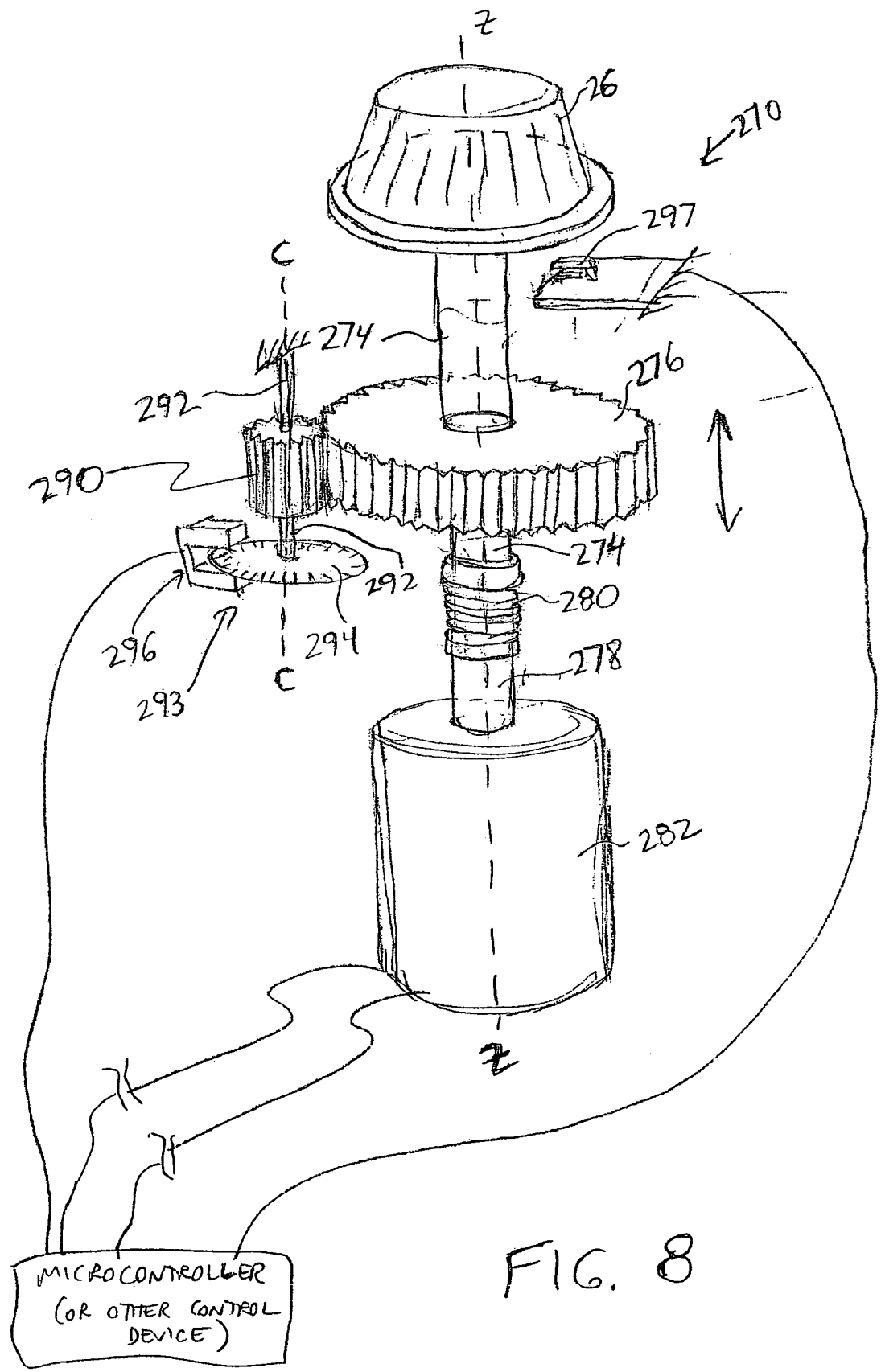
FIG. 8 is a perspective view of a knob control device providing a gear transmission that allows the knob to translate axially.

FIG. 8 is a perspective view of a different embodiment 270 of a mechanism for the knob interface device of the present invention that allows axial motion of the knob. Embodiment 270 includes gears to sense the rotational motion and allow the translation of the knob. Knob 26 can be positioned at the front panel of an electronic device or computer device as described above. The knob can preferably be rotated about an axis Z by the user to provide input to the electronic device. In other embodiments, knob 26 can be other controls, such as a dial or other types of grips, as in the embodiments described above.

Knob 26 is rigidly coupled to a first shaft 274, which has a gear 276 rigidly coupled to the shaft 274 at a portion of the shaft between its two ends. Alternatively, gear 276 can be directly coupled to or be positioned around the knob 26. Thus when the user rotates the knob 26, the shaft 274 and gear 276 are also rotated. The shaft 274 extends from the other side of the gear 276 and is rigidly coupled to one end of a physical spring or torsional coupling 280. Spring 280 is rigidly coupled to a second shaft 278 at the other end of the spring.

Spring 280 allows the shaft 274 to be moved toward or away from the shaft 278 (when the spring is not fully compressed or extended), thus allowing the knob 26, the shaft 274, and the gear 276 to be translated along the Z-axis. The spring force provided by the spring causes a spring return bias on the knob 26 when the knob 26 is moved along the Z-axis away from a neutral or origin spring position. Preferably, a guide (not shown) is provided near the knob 26 (such as at the shaft 274 right behind the knob) to prevent any motion of the knob perpendicular to the axis Z allowed by the spring 280. Such a guide can be an aperture in a front panel of a device through which the shaft 274 extends, for example. Physical stops can also be provided in the linear degree of freedom of the knob to limit the knob to a desired range of translational motion.

Spring 280 also allows rotational motion to be transmitted between shaft 278 and shaft 274 (and thus the knob 26 and gear 276). Spring 280 is preferably rigid in a circumferential direction and does not allow torsion flex, so that rotation of shaft 278 by actuator 282 (discussed below) is transmitted as faithfully as possible to shaft 274 and knob 26 without excessive play or compliance. Helical or other types of springs, or other couplings that allow translation and can transmit rotation, such as a bellows, a helical flexible coupling, or a splined shaft inside of a splined cavity, can be used for spring 280. In still other embodiments, no spring 280 or other coupling is provided, and shaft 278 is instead able to be moved axially with respect to the motor to allow knob axial motion, as in the embodiment 230 shown above in FIG. 6. In alternate embodiments, the motion along axis Z can be actuated by using an actuator to output forces in the linear degree of freedom, such as a linear actuator or a rotary actuator whose rotary output is translated to a linear direction. Such an actuator can be a motor, voice coil actuator, passive brake, etc.

In other embodiments, other couplings between shaft 274 and shaft 278 allowing slidable movement can be used, yet allowing rotational motion to be transmitted from shaft 278 to shaft 274, as is well known in the mechanical arts. In some embodiments, the gear 276 itself can be a sufficient length (parallel to the Z axis) to act as coupling and allow the shaft 278 to move a desired distance relative to the gear 276 and shaft 274. The interior of the coupling, such as the central gear opening, can include gear teeth or other structure to mate with teeth on shaft 278 to allow translational motion while still transmitting rotational motion.

Shaft 278 is rigidly coupled to a grounded actuator 282, which is operative to output a rotational force on the shaft 278 and thus a rotational force on the knob 26. Actuator 282 provides forces that are computer-modulated based on control signals from a computer device including a microprocessor or other controller. Actuator 282 can be an active actuator, such as a DC motor, voice coil actuator, or other type of motor; or the actuator can be a passive actuator such as a brake or passive fluid actuator. A variety of force sensations can be output to the knob, as described below.

An encoder gear 290 is rotatably coupled to a grounded surface and is positioned next to the gear 276. Encoder gear 290 includes gear teeth, which are engaged with the teeth of gear 276 so that rotational motion of gear 276 causes rotation of encoder gear 290 about an axis A. In some embodiments, other transmission devices can be used to transmit rotation from the shaft 274 to the shaft 292; for example, a frictional drive system can be used, most preferably if it allows translation of the two elements held in friction; thus, a hard rubber or similar material can be used. Alternatively, a belt drive transmission can be used, where a small pulley in place of encoder gear 290 is positioned a short distance from the large pulley in place of gear 276 and a belt is looped between the pulleys. An O-ring type belt can be used so that the translation of the large pulley with respect to the small pulley will not upset the functioning of the belt drive.

An encoder shaft 292 is rigidly coupled to ground and to the encoder gear 290 and extends through the encoder gear. A sensor 293 is coupled to the encoder gear to detect the rotational motion of the gear 290 and thus to detect the rotation of gear 276 and knob 26 (the gear 276 rotation being caused by the user and/or the actuator 282). The sensor 293 provides one or more signals to the microcontroller indicating the relative motion of the gear 290 and thus the knob 26. Sensor 293 includes a code wheel 294 that is rigidly coupled to the shaft 292 and rotates in conjunction with the gear 290. Sensor 293 also includes a grounded emitter/detector assembly 296 that is positioned so that an edge of the wheel 294 rotates between at least one emitter and at least one detector of the assembly 296. The wheel includes slots or markings, which can be detected as they rotate past the emitter/detector. This type of optical encoder is well known to those skilled in the art. In a preferred embodiment, two or more detectors are provided in assembly 296 to enable quadrature or similar sensing, allowing the direction of motion to be sensed. In other embodiments, other types of sensors that can sense the motion of a wheel or shaft, such as an analog potentiometer, can be used in place of the optical encoder; an absolute sensor instead of a relative sensor can also be used.

When the knob 26 is translated, the gear 276 and the encoder gear 290 are translated with respect to each other, e.g. in the described embodiment the gear 276 is moved or slid with respect to the encoder gear 290 that is grounded along the Z-axis. The interlocking gear teeth of the two gears allows the gears to be so translated but also allows rotational motion to be transmitted from one gear to the other (as long as at least a portion of the Z-axis length of the teeth of both gears are interlocked). This allows the sensor 293 to be grounded with respect to the knob 26 and yet still measure the rotation of the knob 26.

Preferably, the user can push the knob 26 toward the actuator 282 to activate a sensor and input a button or activation signal. To enable this feature, in the described embodiment, an electrical switch such as contact 297 can be provided in the path of the knob 26 or gear 276. For example, the contact 297 is coupled to ground and is pressed against another contact when the knob 26 engages and pushes the contact 297. This sends a signal to the controlling microcontroller or other circuitry. Thus, the user may push the knob 26 to activate the contact signal h d thereby make a selection input to the electronic device or otherwise provide input to the electronic device.

In other embodiments, other types of sensors can be used to detect a particular position of the knob in the linear degree of freedom along axis Z, or to sense continuous linear motion along axis 2. For example, an optical sensor can use a detector strip parallel to the travel of the knob to detect a particular position of a point or area on the knob (or the gear or shaft 274) that emits or reflects a beam detected by the detector strip.

Figure 9:
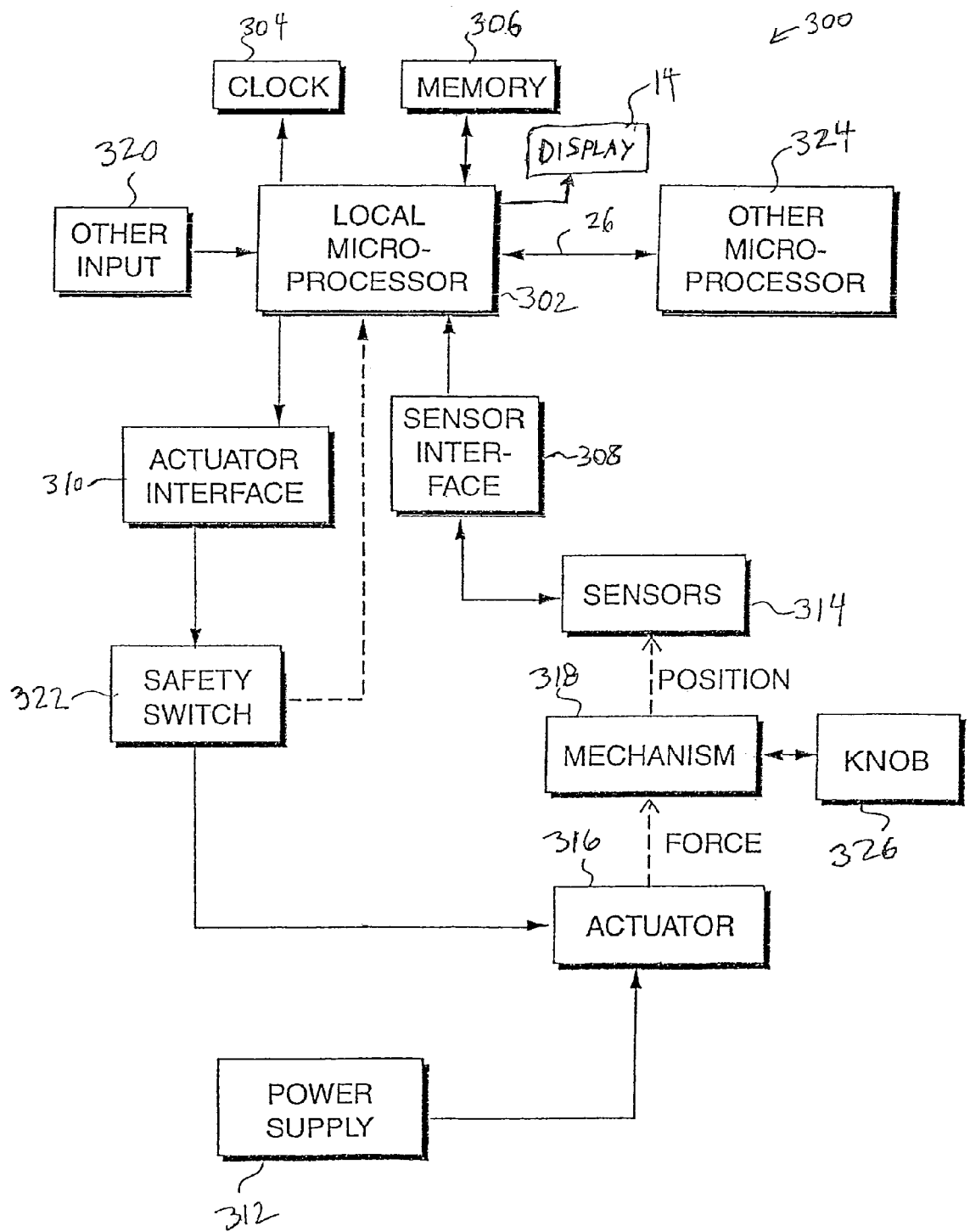
FIG. 9 is a block diagram of a control system for the control device of the present invention.

FIG. 9 is a block diagram illustrating an electromechanical system 300 suitable for use with the device controlled by a knob of the present invention. A haptic feedback system including many of the below components is described in detail in U.S. Pat. No. 5,734,373, which are both incorporated by reference herein in their entirety.

In one embodiment, the controlled device includes an electronic portion having a local microprocessor 302, local clock 304, local memory 306, sensor interface 308, and actuator interface 310.

Local microprocessor 302 is considered "local" to the device, where "local" herein refers to processor 302 being a separate microprocessor from any other microprocessors, such as in a controlling host computer (see below), and refers to processor 302 being dedicated to force feedback and/or sensor 110 for the knob 26. In force feedback embodiments, the microprocessor 302 reads sensor signals and can calculate appropriate forces from those sensor signals, time signals, and force processes selected in accordance with a host command, and output appropriate control signals to the actuator. Suitable microprocessors for use as local microprocessor 302 include the 8X930AX by Intel, the MC68HC711E9 by Motorola and the PIC16C74 by Microchip, for example. Microprocessor 302 can include one microprocessor chip, or multiple processors and/or co-processor chips, and can include digital signal processor (DSP) functionality. Also, "haptic accelerator" chips can be provided which are dedicated to calculating velocity, acceleration, and/or other force-related data. Alternatively, fixed digital logic and/or state machines can be used to provide similar functionality.

A local clock 304 can be coupled to the microprocessor 302 to provide timing data, for example, to compute forces to be output by actuator 316. Local memory 306, such as RAM and/or ROM, is preferably coupled to microprocessor 302 to store instructions for microprocessor 302, temporary and other data, calibration parameters, adjustments to compensate for sensor variations can be included, and/or the state of the device. Display 14 can be coupled to local microprocessor 302 in some embodiments. Alternatively, a different microprocessor or other controller can control output to the display 14.

Sensor interface 308 may optionally be included in to convert sensor signals to signals that can be interpreted by the microprocessor 302. For example, sensor interface 308 can receive signals from a digital sensor such as an encoder and convert the signals into a digital binary number. An analog to digital converter (ADC) can also be used. Alternately, microprocessor 302 can perform these interface junctions. Actuator interface 310 can be optionally connected between the actuator and microprocessor 302 to convert signals from microprocessor 302 into signals appropriate to drive the actuators. Actuator interface 310 can include power amplifiers, switches, digital to analog controllers (DACs), and other components. In alternate embodiments, actuator interface 310 circuitry can be provided within microprocessor 302 or in the actuator(s).

A power supply 312 can be coupled to the actuator and/or actuator interface 310 to provide electrical power. In a different embodiment, power can be supplied to the actuator 316 and any other components (as required) by an interface bus. Power can also be stored and regulated by the device and thus used when needed to drive the actuator.

The mechanical portion of the system can include some or all of the components needed for rotational motion of knob 26, transverse motion of knob 26, the push and/or pull motion of knob 26, and haptic feedback in any or all of these degrees of freedom of the knob, as described above. Sensors 314 sense the position, motion, and/or other characteristics of knob 26 along one or more degrees of freedom and provide signals to microprocessor 302 including information representative of those characteristics. Typically, a sensor 314 is provided for each degree of freedom along which knob 26 can be moved, or, a single compound sensor can be used for multiple degrees of freedom. Examples of suitable sensors include optical encoders, analog sensors such as potentiometers, Hall effect magnetic sensors, optical sensors such as a lateral effect photo diodes, tachometers, and accelerometers. Furthermore, both absolute and elative sensors may be used.

In those embodiments including force feedback, actuator 316 transmits forces to knob 26 in one or more directions in a rotary degree of freedom in response to signals output by microprocessor 302 or other electronic logic or device, i.e., it is "electronically controlled." The actuator 316 produces electronically modulated forces, which means that microprocessor 302 or other electronic device controls the application of the forces. Typically, an actuator 316 is provided for each knob 26 that includes force feedback functionality. In some embodiments, additional actuators can also be provided for the other degrees of freedom of knob 26, such as the transverse motion of the knob 26 and/or the push or pull motion of the knob. Actuator 316, can be an active actuators, such as a linear current control motor, stepper motor, pneumatic/hydraulic active actuator, a torquer (motor with limited angular range), voice coil actuator, etc. Passive actuators can also be used, including magnetic particle brakes, friction brakes, or pneumatic/hydraulic passive actuators, and generate a damping resistance or friction in a degree of motion.

Mechanism 318 is used to translate motion of knob 26 to a form that can be read by sensors 314, and, in those embodiments including force feedback, to transmit forces from actuator 316 to knob 26. Examples of mechanism 318 are shown above. Also, a drive mechanism such as a belt drive, gear drive, or capstan drive mechanism can be used to provide mechanical advantage to the forces output by actuator 316. Some examples of capstan drive mechanisms are described in U.S. Pat. No. 5,731,804.

Other input devices 320 can be included to send input signals to microprocessor 302. Such input devices can include buttons or other controls used to supplement the input from the panel to the controlled device. Also, dials, switches, voice recognition hardware (e.g. a microphone, with software implemented by microprocessor 302), or other input mechanisms can also be included to provide input to microprocessor 302 or to the actuator 316. A deadman switch can be included on or near the knob to cause forces to cease outputting when the user is not contacting the knob as desired to prevent the knob from spinning on its own when the user is not touching it, e.g. contact of a user's digit (finger, thumb, etc.) with the knob can be detected, pressure on the knob 26 from the user can be detected.

Other microprocessor 324 can be included in some embodiments to communicate with local microprocessor 302. Microprocessors 302 and 324 are preferably coupled together by a bi-directional bus 326. Additional electronic components may also be included for communicating via standard protocols on bus 326. These components can be included in the device or another connected device. Bus 326 can be any of a variety of different communication busses. For example, a bi-directional serial or parallel bus, a wireless link, a network architecture (such as CANbus), or a uni-directional bus can be provided between microprocessors 324 and 302.

Other microprocessor 324 can be a separate microprocessor in a different device or system that coordinates operations or functions with the controlled device. For example, other microprocessor 324 can be provided in a separate control subsystem in a vehicle or house, where the other microprocessor controls the temperature system in the car or house, or the position of mechanical components (car mirrors, seats, garage door, etc.), or a central display device that displays information from various systems. Or, the other microprocessor 324 can be a centralized controller for many systems including the controlled device. The two microprocessors 302 and 324 can exchange information as needed to facilitate control of various systems, output event notifications to the user, etc. For example, if other microprocessor 324 has determined that the vehicle is overheating, the other microprocessor 324 can communicate this information to the local microprocessor 302, which then can output a particular indicator on display 14 to warn the user. Or, if the knob 26 is allowed different modes of control, the other microprocessor 324 can control a different mode. Thus, if the knob 26 is able to control both audio stereo output as well as perform temperature control, the local microprocessor 302 can handle audio functions but can pass all knob sensor data to other microprocessor 324 to control temperature system adjustments when the device is in temperature control mode.

In other embodiments, other microprocessor 224 can be a host microprocessor, for example, that commands the local microprocessor 202 to output force sensations by sending host commands to the local microprocessor. The host microprocessor can be a single processor or be provided in a computer such as a personal computer, workstation, video game console, portable computer or other computing or display device, set top box, "network-computer", etc. Besides microprocessor 224, the host computer can include random access memory (RAM), read only memory (ROM), input/output (I/O) circuitry, and other components of computers well-known to those skilled in the art. The host processor can implement a host application program with which a user interacts using knob 26 and/or other controls and peripherals.

The host application program can be responsive to signals from knob 26 such as the transverse motion of the knob, the push or pull motion, and the rotation of the knob (e.g., the knob 26 can be provided on a game controller or interface device such as a game pad, joystick, steering wheel, or mouse that is connected to the host computer). In force feedback embodiments, the host application program can output force feedback commands to the local microprocessor 202 and to the knob 26. In a host processor embodiment or other similar embodiment, microprocessor 202 can be provided with software instructions to wait for commands or requests from the host processor, parse/decode the command or request, and handle/control input and output signals according to the command or request.

For example, in one force feedback embodiment, host microprocessor 324 can provide low-level force commands over bus 326, which microprocessor 302 directly transmits to the actuators. In a different force feedback local control embodiment, host microprocessor 324 provides high level supervisory commands to microprocessor 302 over bus 326, and microprocessor 302 manages low level force control loops to sensors and actuators in accordance with the high level commands and independently of the host computer. In the local control embodiment, the microprocessor 302 can independently process sensor signals to determine appropriate output actuator signals by following the instructions of a "force process" that may be stored in local memory 306 and includes calculation instructions, formulas, force magnitudes (force profiles), and/or other data.

The force process can command distinct force sensations, such as vibrations, textures, jolts, or even simulated interactions between displayed objects. Such operation of local microprocessor in force feedback applications is described in greater detail in U.S. Pat. No. 5,734,373, previously incorporated herein by reference.

In an alternate embodiment, no local microprocessor 302 is included in the interface device, and a remote microprocessor, such as microprocessor 324, controls and processes all signals to and from the components of the interface device. Or, hardwired digital logic can perform any input/output functions to the knob 26.

While this invention has been described in terms of several preferred embodiments, there are alterations, modifications, and permutations thereof, which fall within the scope of this invention. It should also be noted that the embodiments described above can be combined in various ways in a particular implementation.

Furthermore, certain terminology has been used for the purposes of descriptive clarity, and not to limit the present invention. It is therefore intended that the following appended claims include such alterations, modifications, and permutations as fall within the true spirit and scope of the present invention.

That which is claimed:
1. A haptic controller device comprising:
a user manipulandum rotatable in a rotary degree of freedom about an axis of rotation extending through said manipulandum, said manipulandum also moveable linearly in a plane perpendicular to said axis of rotation;
a rotational sensor that detects a position of said manipulandum in said rotary degree of freedom;
an actuator coupled to said manipulandum and operative to output a force to said manipulandum in said rotary degree of freedom about said axis, wherein said actuator includes a shaft that is coaxial with said axis of rotation, and wherein said shaft can be moved linearly along said axis of rotation to accommodate said linear motion of said manipulandum; and a sensor for detecting said linear motion of said manipulandum along said axis of rotation.

2. A haptic controller device as recited in claim 1, wherein said shaft of said actuator is rigidly coupled to a rotor of said actuator such that said rotor and said shaft can concurrently move linearly along said axis of rotation, and wherein a stator of said actuator is grounded.

3. A haptic controller device as recited in claim 2, wherein magnets of said stator extend to a length greater than a length of an armature of said rotor, such that said armature is always completely within a magnetic field of said magnets regardless of a position of said shaft along said axis of rotation.

4. A haptic controller device as recited in claim 2, wherein commutator bars of said actuator are a greater length than necessary if said shaft did not move, such that brushes of said actuator are in continuous contact with said commutator bars regardless of a position of said shaft along said axis of rotation.

5. A haptic controller device as recited in claim 1, wherein a rotor and a stator of said actuator are grounded with respect to said linear motion of said shaft along said axis of rotation.

6. A haptic controller device as recited in claim 5, wherein said shaft includes a first feature and wherein said shaft slides within a bore in said rotor having a second feature that engages said first feature and allows said shaft to rotate said rotor.

7. A haptic controller device as recited in claim 1, wherein said actuator is a DC brush type motor.

8. A haptic controller device as recited in claim 2, wherein said rotor includes skewed teeth to reduce a cogging effect when said actuator is in operation.

9. A haptic controller device as recited in claim 1, wherein said user manipulandum is also moveable in a plurality of transverse directions approximately perpendicular to said axis, and further comprising a transverse sensor operative to detect movement of said knob in any of said transverse directions.

10. A haptic controller device as recited in claim 1, wherein said user manipulandum is a knob.

* * * * *